US010312551B2

United States Patent
Zheng et al.

(10) Patent No.: US 10,312,551 B2
(45) Date of Patent: Jun. 4, 2019

(54) PREPARATION METHOD OF IONIC LIQUIDS AND SECONDARY BATTERIES

(71) Applicant: Microvast Power Systems Co., Ltd., Huzhou, Zhejiang Province (CN)

(72) Inventors: Zhuoqun Zheng, Huzhou (CN); Dawei Shen, Huzhou (CN); Jian Qiu, Huzhou (CN); Yunhua Nie, Huzhou (CN); Xiaozhen Zhao, Huzhou (CN); Danyi Li, Huzhou (CN)

(73) Assignee: MICROVAST POWER SYSTEMS CO., LTD., Huzhou, Zhejiang Province (CN)

( * ) Notice: Subject to any disclaimer, the term of this patent is extended or adjusted under 35 U.S.C. 154(b) by 194 days.

(21) Appl. No.: 15/261,942

(22) Filed: Sep. 10, 2016

(65) Prior Publication Data
US 2017/0077557 A1    Mar. 16, 2017

(30) Foreign Application Priority Data

Sep. 11, 2015    (CN) .......................... 2015 1 0575017

(51) Int. Cl.
*H01M 10/42*    (2006.01)
*H01M 10/0568*    (2010.01)
(Continued)

(52) U.S. Cl.
CPC ... *H01M 10/4235* (2013.01); *H01M 10/0525* (2013.01); *H01M 10/0568* (2013.01); *H01M 10/0569* (2013.01); *H01M 2300/0028* (2013.01)

(58) Field of Classification Search
CPC ............. H01M 10/42; H01M 10/4235; H01M 10/0568; H01M 10/0569; H01M 10/0525
See application file for complete search history.

(56) References Cited

U.S. PATENT DOCUMENTS

| 4,892,944 A | 1/1990 | Mori et al. |
| 2008/0009633 A1* | 1/2008 | Szarvas ................. C07C 209/20 |
| | | 546/347 |

FOREIGN PATENT DOCUMENTS

| CN | 1948268 A | * 4/2007 | .......... C07C 209/00 |
| CN | 1948268 A | 4/2007 | |

(Continued)

OTHER PUBLICATIONS

Jin-Qiang Xu, Jun Yang, Yan-Na Nuli, Wan-Bin Zhang, "Study of Ionic Liquid Electrolytes for Secondary Lithium Batteries", Acta Chimica Sinica, 2005, pp. 1733-1738, Issue No. 18, vol. 63, China Academic Journal Electronic Publishing House, China.

(Continued)

*Primary Examiner* — Karie O'Neill Apicella
(74) *Attorney, Agent, or Firm* — Cheng-Ju Chiang

(57) ABSTRACT

The present invention relates to a preparation method of ionic liquids, particularly to a one-step reaction method used for synthesizing quaternary ammonium compounds or quaternary phosphonium compounds. In the method, a nitrogenous or phosphorous compound, a proton compound, and a carbonate ester are added into a reactor simultaneously to synthesize corresponding the quaternary ammonium ionic liquid or the quaternary phosphonium ionic liquid through said one-step reaction, i.e., 'one-pot method' reaction, during which three reactants are involved. The present invention also provides a lithium ion secondary battery comprising the ionic liquid prepared by above-mentioned preparation method. The ionic liquid preparation method of the present invention can widen the choice range of raw materials needed when preparing ionic liquids, and further widen the synthesized ionic liquid species.

20 Claims, 10 Drawing Sheets

(51) Int. Cl.
*H01M 10/0525* (2010.01)
*H01M 10/0569* (2010.01)

(56) References Cited

FOREIGN PATENT DOCUMENTS

| CN | 101039913 A | 9/2007 |
| CN | 101245019 B | 4/2011 |
| CN | 102903954 A | 1/2013 |
| CN | 104300176 A | 1/2015 |

OTHER PUBLICATIONS

Honghe Zheng, Qunting Qu, Li Zhang, Gao Liu, Vincent S. Battaglia, "Hard Carbon: a Promising Lithium-Ion Battery Anode for High Temperature Applications with Ionic Electrolyte", RSC Advances, 2012, Issue No. 2, pp. 4904-4912, The Royal Society of Chemistry.

\* cited by examiner

PREPARATION METHOD OF IONIC LIQUIDS AND SECONDARY BATTERIES

CROSS REFERENCE TO RELATED APPLICATION

The present application is based on and claims priority of Chinese Patent Application No. 201510575017.4, filed on Sep. 11, 2015. The entire disclosure therein of the above-identified application, including the specification, drawings and claims are incorporated herein by reference in its entirety.

FIELD OF THE INVENTION

The present application relates to a preparation method of ionic liquids and more particularly relates to a one-step reaction to synthesize quaternary ammonium compounds or quaternary phosphonium compounds.

BACKGROUND OF THE INVENTION

An ionic liquid is a salt in the liquid state, and is entirely comprised of ionic composition. Because the ionic liquid remains liquid at room temperature or a lower temperature (−97° C.~100° C.), the ionic liquid is described as a room temperature molten salt or a low temperature molten salt, and also as a liquid organic salt. There are many types of ionic liquids, and according to different organic cations, ionic liquids can be divided into quaternary ammonium salts, quaternary phosphonium salts, nitrogen heterocyclic onium salts, etc., such as nitrogen heterocyclic type ionic liquids including imidazolium onium salts, pyridinium onium salts, piperidinium salts, pyrrolidine salts, etc. There are various types of anions which could constitute ionic liquids, wherein inorganic anions comprise $F^-$, $Cl^-$, $Br^-$, $I^-$, $NO_3^-$, $CO_3^{2-}$, $PF_6^-$, $BF_4^-$, $C_2O_4^{2-}$, $SO_4^{2-}$, $PO_4^{3-}$, $Al_2Cl_7^-$, etc., while organic anions comprise $CH_3COO^-$, $CF_3SO_3^-$, $C_4H_9SO_3^-$, $CF_3COO^-$, $N(FSO_2)_2^{2-}$, $N(CF_3SO_2)_2^{2-}$, $N(C_2F_5SO_2)_2^{2-}$, $N(C_4F_9SO_2)_2^{2-}$. $N[(CF_3SO_2)(C_4F_9SO_2)]^-$, $C(CF_3SO_2)_3^{3-}$, etc. Theoretically speaking, there exist more than $10^{18}$ kinds of ionic liquids. Structures of cations and anions of several common imine based ionic liquids are as follows:

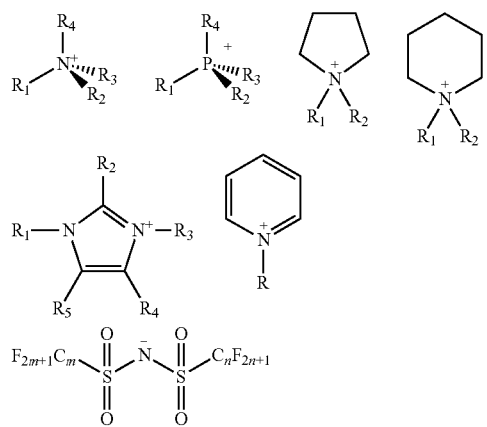

In the 1970s, American scientist John S. Wilks applied ionic liquids into a battery system for the first time. Since the 1990s, extensive research has been conducted on applying ionic liquids into lithium ion secondary batteries, and the feasibility and superiority of ionic liquids acting as electrolyte solvents of lithium ion secondary batteries have gained increasing recognition and attention from industry experts. Compared with the current widely used organic solvents with carbonate ester, ionic liquids acting as the electrolyte solvents of lithium ion secondary batteries have the following advantages: (1) The liquid temperature region of ionic liquids is wider than that of a conventional solvent. For example, dimethyl carbonate (DMC) is widely used in lithium ion secondary batteries as an electrolyte solvent, but it has only a narrow liquid temperature region of 2~90° C. Furthermore, for most ionic liquids, the maximum liquid temperature may reach about 300° C. (their decomposition temperature). Some other ionic liquids may have much wider liquid temperature region from −70° C. to 400° C., which have greatly expanded the temperature scope of the application of lithium ion secondary batteries (for example, extending to higher temperature application). (2) As ionic substances, ionic liquids have good dissolving ability, and their concentration is adjustable. Corresponding ionic liquids can dissolve several common lithium salts, such as $LiPF_6$, $LiBF_4$, $LiCF_3SO_3$, $LiN(SO_2CF_3)_2$, etc., and a high solute concentration can be achieved, which could meet the requirements of lithium ion concentration in electrolytes when using a lithium ion secondary battery as a power battery. (3) Ionic liquids have good ionic conductivity, and their ionic conductivity could be up to 1~10 mS/cm in the absence of lithium salts. (4) Ionic liquids have both a high thermal stability and a high chemical stability. For example, the thermal decomposition temperature of most ionic liquids would be more than 400° C., and in normal cases, ionic liquids would not react with common electrode materials of lithium ion secondary batteries, such as $LiFePO_4$, $LiCoO_2$, $Li_4Ti_5O_{12}$, graphite, etc. (5) Ionic liquids have no noticeable vapor pressure even at temperatures more than 100° C. When the battery runs in high temperature environment, deformation in battery due to the extremely high pressure would not occur. For example, it is difficult for a 'bulge' phenomenon to occur when ionic liquids are applied in a soft-packaging battery using an aluminum-plastic composite membrane. (6) Ionic liquids have no flash point, but their fire points are high. Some ionic liquids are not flammable even if exposed to open flames. Carbonate solvents that are currently used in secondary batteries are flammable and combustible; because of that, there is a safety threat when applying such carbonate solvents into a lithium ion secondary battery. By comparison, ionic liquids can be applied to electrolytes, and are expected to solve the safety issues of the lithium ion secondary batteries.

At present, ionic liquids used as electrolyte solvents in lithium ion secondary batteries are mainly quaternary ammonium salts, pyridinium salts, pyrrolidine salts, imidazolium onium salts, and pyridinium onium salts with their anions being $BF_4^-$, $PF_6^-$, $CF_3SO_3^-$, $N(CF_3SO_2)_2^-$. Different combination of anions and cations have great influence on physical and chemical properties of ionic liquid based electrolyte, and even directly impact the performance of lithium ion secondary batteries. In recent years, many studies have shown that those ionic liquids whose anions are iminium ions tend to have lower melting points, and their combination with a variety of cations would form molten salts whose melting points are lower than 0° C. All these advantages broaden the scope of the choice of the cations, making quaternary ammonium cations, piperidine cations, and pyrrolidine cations with greater electrochemical stability suitable for application in lithium ion secondary battery systems. For example, N-methyl-N-butyl-piperidinium bis (trifluoromethylsulfonyl) imide [PP13-TFSI] with a melting point of −18° C. has an excellent performance when used in a Li/LiCoO₂ battery system: the specific capacity of the positive active material can reach 150 mAh/g, the coulombic efficiency can reach 100%, and there is no obvious decay after ten weeks of circulation (XU Jin-qiang, etc., [J]chemistry journal, 63(18): 1733); Zheng Honghe research group from Suzhou University finds that when the N,N,N-trimethyl-N-hexyl-bis(trifluoromethylsulfonyl) imide quaternary ammonium salt is applied to the lithium ion secondary battery whose negative active material is hard carbon, even under high temperature of 80° C., the battery could also discharge and charge normally, and intercalation/deintercalation behavior of ionic liquid cation in hard carbon will not occur. That research group believes that the combination between such ionic liquids and hard carbon will have prospective applications (RSC Adv., 2012,2,4904 4912).

The traditionally used processing technology of ionic liquids, taking a quaternary ammonium salt as an example, is an alkylated reaction between a tertiary amine and an alkyl halide, and its reaction is shown below:

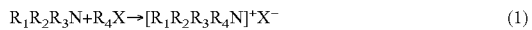

$$R_1R_2R_3N+R_4X \rightarrow [R_1R_2R_3R_4N]^+X^- \quad (1)$$

For example, tributyl methyl iodide ammonium can be obtained from the reaction of tributyl tertiary amine and iodomethane:

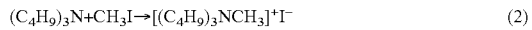

$$(C_4H_9)_3N+CH_3I \rightarrow [(C_4H_9)_3NCH_3]^+I^- \quad (2)$$

During the preparation of a quaternary ammonium salt having at least one methyl substituent on nitrogen element, the dimethyl sulfate could also be used as an alkylating agent, as shown below:

$$R_1R_2R_3N+(CH_3)_2SO_4 \rightarrow [R_1R_2R_3NCH_3]^+CH_3SO_4^- \quad (3)$$

It is easier for a tertiary amine to react with dimethyl sulfate, and such reaction has a high yield. But using dimethyl sulfate also has disadvantages such as high toxicity, and it may cost cancer. The biggest disadvantage of the above-mentioned technique is that it can only prepare certain quaternary ammonium salts. For example, for quaternization reaction of the alkyl halide, this process can only prepare the quaternary ammonium salts whose anion is Cl⁻, Br⁻, or I⁻; for quaternization reaction of dimethyl sulfate, this process can only prepare quaternary ammonium salts whose anion is CH₃SO₄⁻. To prepare other quaternary ammonium salts whose anion is another ion, ion-exchange reactions such as those shown in formula (4) and formula (5) could be used:

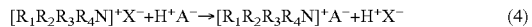

$$[R_1R_2R_3R_4N]^+X^-+H^+A^- \rightarrow [R_1R_2R_3R_4N]^+A^-+H^+X^- \quad (4)$$

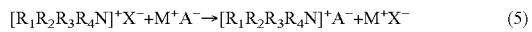

$$[R_1R_2R_3R_4N]^+X^-+M^+A^- \rightarrow [R_1R_2R_3R_4N]^+A^-+M^+X^- \quad (5)$$

For example, when preparing the quaternary ammonium salt $[R_1R_2R_3R_4P]_2^{2+}SO_4^{2-}$ whose anion is $SO_4^{2-}$, generally, a chlorinated quaternary ammonium salt would be firstly synthesized via the formula (1) reaction; and then, making the quaternary ammonium chloride to react with sulfuric acid via the reaction of formula (4), and removing hydrochloric acid by taking advantage of the volatile feature of hydrochloric acid, therefore making the reaction (4) equilibrium go to right, thus making ion-exchange to maximum extent. And for another example, when preparing a quaternary ammonium salt $[R_1R_2R_3R_4P]^+BF_4^-$ whose anion is $BF_4^-$, similarly, corresponding quaternary ammonium halides salt is firstly synthesized via formula (1) reaction; and then, via formula (5), the quaternary ammonium halides salt and the metal inorganic salt such as $NaBF_4$ react in the organic solvent such as acetone, since the metal halide has a low solubility in the organic solvent, halide ions would precipitate from the solution in the form of precipitation, thus ion-exchange would be realized. Obviously, formula (4) and formula (5) are equilibrium reactions, which mean they do not always go to completion, which would inevitably lead to halide ion residue in final products. Even if silver salts such as $AgBF_4$ are used to facilitate reaction (5) being carried out in aqueous solution, which may react completely, the cost would be prohibitively expensive.

On the one hand, halogen anions such as Cl⁻, Br⁻, and I⁻ have poor stability, and tend to be oxidized to release poisonous and corrosive halogen substance, which restrict its application scope; On the other hand, after extensive research, it has been found that when the anion is chosen from one of the following ions group of F⁻, $NO_3^-$, $CO_3^{2-}$, $PF_6^-$, $BF_4^-$, $C_2O_4^{2-}$, $SO_4^{2-}$, $PO_4^{3-}$, $Al_2Cl_7^-$, $CH_3COO^-$, $CF_3SO_3^-$, $C_4H_9SO_3^-$, $CF_3COO^-$, $N(CF_3SO_2)_2^-$, $N(FSO_2)_2^-$, $N(C_2F_5SO_2)_2^-$, $N(C_4F_9SO_2)_2^-$, $N[(CF_3SO_2)(C_4F_9SO_2)]^-$, $C(CF_3SO_2)_3^-$, etc., quaternary ammonium salts normally have certain features that quaternary ammonium halides salts usually do not possess, such as low melting points, high conductivity, low viscosity and strong hydrophobicity etc., therefore they have a wider scope of potential application. For this reason, to develop a new preparation process of these special quaternary ammonium salts is particularly important.

U.S. Pat. No. 4,892,944 describes a method of preparing a quaternary ammonium/phosphonium salt using dimethyl carbonate as an alkylating agent. The method includes two steps, in the first step, tertiary amine/phosphine reacts with dimethyl carbonate to generate a quaternary ammonium/phosphonium methyl carbonate; in the second step, the quaternary ammonium/phosphonium methyl carbonate react with an acid to release methanol and carbon dioxide, and obtain a quaternary ammonium/phosphonium salt, the anion species of the quaternary ammonium/phosphonium salt are determined by the acids being used, and reaction equations are as follows:

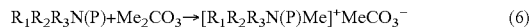

$$R_1R_2R_3N(P)+Me_2CO_3 \rightarrow [R_1R_2R_3N(P)Me]^+MeCO_3^- \quad (6)$$

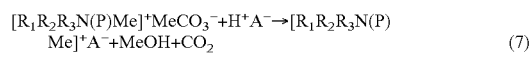

$$[R_1R_2R_3N(P)Me]^+MeCO_3^-+H^+A^- \rightarrow [R_1R_2R_3N(P)Me]^+A^-+MeOH+CO_2 \quad (7)$$

One feature of this method is that, the anions of the obtained quaternary ammonium/phosphonium salts derive from anions of various acids, which will not be limited by quaternary ammonium/phosphonium agents, and the materials of anions can be select from a variety of ranges. However, the reactants have to be limited within a tertiary amine or a tertiary phosphine. Only the tertiary amine or the tertiary phosphine could be alkylated by dimethyl carbonate to generate corresponding quaternary ammonium/phosphonium salt; however, ammonia (NH₃), the primary amine, the secondary amine or hydrogen phosphide (PH₃), the primary phosphine and the secondary phosphine could not be alkylated by dimethyl carnonate, and therefore could not get quaternary ammonium/phosphonium cations.

Both relevant Chinese patents (No. CN200510061094.4, application date 2005.10.10; No. CN200710008626.7, application date 2007.2.14) disclose that a kind of dialkyl carbonate react with an amine (ammonium) salt at a suitable temperature and a pressure (50° C.~300° C., 0.5 MPa~50 Mpa, 4~12 h) to generate a quaternary ammonium salt; both patents take the carbonate ester as an alkylating agent, and the hydrogen of the amine salt is substituted by methyl in reaction and thus quaternary ammonium salt is obtained. However, these two technical solutions also have great differences, and one of the main differences lies in the use of catalysts. The technical scheme of Patent No. CN200510061094.4 needs to use the catalyst selected from a metallic compound, a non-metallic compound, its mixture or an ionic liquid; therefore, how to separate the product from the catalyst still remains an issue after completion of the reaction, and it is difficult to ensure the high-purity of the product. Meanwhile, the technical scheme disclosed in Patent No. CN200710008626.7 does not use catalysts, and does not need subsequent complicated separation process, its operating process is relatively simple, while its product purity improves greatly. In that way, it is more useful to some applications which have much higher product purity requirements. However, these two methods all emphasize the synthesis of corresponding quaternary ammonium salt from an amine (ammonia) salt, namely, taking the products after neutralization reaction between an amine (ammonia) and an acid as reactants, such as $NH_4^+L^-$, $RNH_3^+L^-$, $R_1R_2NH_2^+L^-$, $R_1R_2R_3NH^+L^-$.

SUMMARY OF THE INVENTION

The first objective of present application is to provide a one-step method (i.e. "one-pot method") for synthesizing ionic liquids, which can broaden the range of potential raw materials that can be used when preparing ionic liquids, and can further increase the variety of synthesized ionic liquid. The raw materials used in this preparation method are nontoxic and non-poisonous, the reaction condition is moderate, the reaction has no special requirements for equipments and the production cost is low, all of which make the application useful to the clean-tech chemicals industry and large-scale industrial production. The concrete technical scheme used for realizing the first object above is to provide a preparation method of an ionic liquid, wherein the ionic liquid is synthesized by a one-step method between a nitrogenous compound or a phosphorous compound, a proton compound and a carbonate ester; wherein the nitrogenous compound is at least one selected from a group consisting of ammonia ($NH_3$), a primary amine($RNH_2$), a secondary amine($R_1R_2NH$) and a tertiary amine($R_1R_2R_3N$); wherein the phosphorous compound is at least one selected from a group consisting of phosphine($PH_3$), a primary phosphine($RPH_2$), a secondary phosphine($R_1R_2PH$) and a tertiary phosphine($R_1R_2R_3P$); wherein each of said $R_1$, $R_2$ and $R_3$ is selected from hydrogen, alkyl, alkenyl, alkynyl, phenyl or aryl; or each of said $R_1$, $R_2$ and $R_3$ is an organic groups comprising at least one element of the following: boron, silicon, oxygen, nitrogen, phosphorus, sulfur, fluorine, chlorine, bromine and iodine; each of said $R_1$, $R_2$ and $R_3$ is a substituent group; or at least two of $R_1$, $R_2$ and $R_3$ adjacent to each other joined into a ring. Taking the nitrogenous compound as an example, it could be a $sp^3$- hybridized ammonia or amine, it could also be a $sp^2$- hybridized imine compound wherein the structure of $R_1$, $R_2$, $R_3$ can be identical, or different. In one embodiment, said organic group is alkyl, alkenyl, alkynyl, phenyl or aryl.

The ionic liquid synthesis method of the invention is specially suitable for electro-chemical systems which require high purity for compounds, such as lithium ion secondary batteries, electrochemical super capacitors, etc. Such ionic liquids also have applications in fields such as the cleantech chemicals industry, biology, and catalysis. The raw materials used in the method are nontoxic and can be chosen from variety of materials; they require only moderate reaction condition without special requirements for equipments. In principle, the present invention can use all common reactors suitable for the liquid phase reaction. Furthermore, its method is simple to operate in the feeding, mixing, distilling and filtering steps.

The present invention provides a one-step reaction method to prepare a quaternary ammonium ionic liquid and a quaternary phosphonium ionic liquid. Unlike conventional methods, the invented method is a "one-pot method", i.e. three reactants (an amine or phosphines, a carbonate ester and a proton compound) are added together into a reactor for reaction. Furthermore, with the initial reactants being ammonia ($NH_3$), a primary amine ($RNH_2$), a secondary amine ($R_1R_2NH$), a tertiary amine ($R_1R_2R_3N$) or phosphine ($PH_3$), a primary phosphine ($RPH_2$), a secondary phosphine ($R_1R_2PH$), or a tertiary phosphine ($R_1R_2R_3P$), the corresponding quaternary ammonium or quaternary phosphonium compound could be obtained by such a one-step reaction. Compared with the two-step reaction utilizing a tertiary phosphine or a tertiary amine as an initial reactant (U.S. Pat. No. 4,892,944), the "one-pot method" of the present invention can take at least one of the following ammonia ($NH_3$), a primary amine ($RNH_2$), a secondary amine ($R_1R_2NH$), a tertiary amine ($R_1R_2R_3N$) or phosphine ($PH_3$), a primary phosphine ($RPH_2$), a secondary phosphine ($R_1R_2PH$), and a tertiary phosphine ($R_1R_2R_3P$) as an initial reactant. The obvious result of using this method is that there are more choices for initial reactants, and the structure of ionic liquids that can be obtained takes various forms which leads to more species. For example, when preparing a tetramethyl tetrafluoroborate phosphonium salt, according to the invented method, any of phosphine ($PH_3$), methylphosphine, dimethylphosphine, or trimethylphosphine can be used as an initial reactant, whereas according to U.S. Pat. No. 4,892,944, the initial reactant could only be chosen as trimethylphosphine. Compared with relevant Chinese patents (CN200510061094.4 and CN200710008626.7), which identify methods to prepare a quaternary ammonium salt with an amine salt or an ammonia as the initial reactant, the invented method takes amine as initial reactant, it is clear that the present invention simplifies reactions steps. To illustrate, if an amine salt is used as a reactant, it is necessary to first obtain an amine salt by the reaction of the amine with an acid, and then for the amine salt to react with a carbonate to obtain a quaternary ammonium compound. However, using the "one-pot method" reaction of the present invention, three reactants (an amine, a carbonate ester and a proton compound) can be added into a reactor together, and the reaction only involves the above three reactants, and does not need to involve an amine salt; therefore, there is no need to divide the whole process into first step and second step reactions.

In the one-step reaction of the present invention, a nitrogenous compound or a phosphorus compound, a proton compound and a carbonate ester can be fed into a reactor simultaneously; or the reaction can occur by first adding the nitrogenous compound or the phosphorus compound, and the carbonate ester into a reactor, and then adding the proton compound into the reactor; or by first adding the nitrogenous compound or the phosphorus compound, and the proton compound into a reactor, and then adding the carbonate ester into the reactor; or by first adding nitrogenous compound or phosphorus compound into a reactor, and then adding the carbonate ester and the proton compound into the reactor.

In one embodiment of the present invention, three reactants ("A" representing a nitrogenous compound or a phosphorus compound, "B" representing a carbonate ester, and "C" representing a proton compound) can be added into a reactor simultaneously in predetermined amounts and react with each other; or the reaction can also be achieved by first adding A and B into a reactor, and then adding C at a certain rate ; it could also be achieved by first adding A and C into a reactor, and then adding B at a certain rate; or, it could also be achieved by first adding A into a reactor, and then adding B and C at a certain rate. As described in the embodiments, in embodiment 14, embodiment 15, embodiment 16, embodiment 19, embodiment 20, embodiment 21, embodiment 23, embodiment 26, it can be achieved by first adding the reactant A and the reactant B, and then adding the reactant C, and the reaction starts from an initial reactant of an amine, therefore it clearly differs from the Chinese patents (CN200510061094.4 and CN200710008626.7) which disclose in each case reactions starting from an amine salt; in embodiment 10 and embodiment 13 of the present invention, the reaction starts from a primary amine, which is similarly differs clearly from U.S. Pat. No. 4,892,944 which discloses a reaction starting from a tertiary amine or a tertiary phosphine. Particularly noteworthy is that there is an obvious difference between the reaction schemes disclosed in embodiment 17, embodiment 18, embodiment 22, embodiment 24, embodiment 25 and the reaction scheme used in the conventional technology. See Table 1 for details.

TABLE 1 reaction conditions of various embodiments of the present invention

| | Reactant A | Reactant B | Reactant C | Reactant feed mode |
|---|---|---|---|---|
| Embodiment 1 | tertiary amine | Dimethyl carbonate | Sulfuric acid | First adding A and B, then adding C |
| Embodiment 2 | tertiary amine | Dimethyl carbonate | HTFSI | First adding A and B, then adding C |
| Embodiment 3 | tertiary amine | Dimethyl carbonate | HTFSI | First adding A and B, then adding C |
| Embodiment 4 | tertiary amine | Dimethyl carbonate | Trifluoro-methane-sulfonic Acid (TFMS) | First adding A, then adding the mixture of B and C |
| Embodiment 5 | SP² hybridized nitride | Dimethyl carbonate | Tera-fluoro-borate | First adding A and C, finally adding B |
| Embodiment 6 | tertiary amine | Dimethyl carbonate | HTFSI | First adding C, then adding A and B |
| Embodiment 7 | tertiary amine | Dimethyl carbonate | HTFSI | Adding A, B, C simultaneously |
| Embodiment 8 | tertiary amine | Diethyl carbonate | HTFSI | First adding A and C, then adding B |
| Embodiment 9 | secondary amine | Diethyl carbonate | HTFSI | First adding C, then adding the mixture of A and B |
| Embodiment 10 | primary amine | Dimethyl carbonate | Sulfuric acid | First adding A and B, then adding C |
| Embodiment 11 | secondary amine | Dimethyl carbonate | Hydro-chloric Acid | First adding A and B, then adding C |
| Embodiment 12 | tertiary amine | Ethylene carbonate | Hydro-chloric Acid | Adding A, B and C simultaneously |
| Embodiment 13 | primary amine | Dimethyl carbonate | HFSI | First adding A and B, then adding C |

In table 1, HTFSI refers to bis(trifluoroMethanesulfonyl)imide, and HFSI refers to bis(fluorosulfonyl)imide.

In one embodiment of the preparation method of the ionic liquid of the present invention, the nitrogenous compound is at least one compound selected from a group consisting of

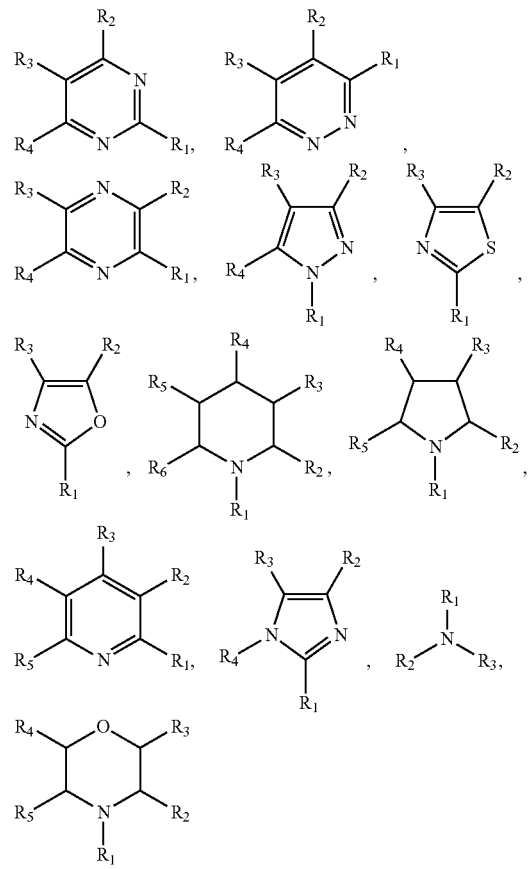

wherein each of said $R_1$, $R_2$, $R_3$, $R_4$, $R_5$ and $R_6$ is selected from hydrogen, alkyl, alkenyl, alkynyl, phenyl or aryl; or each of said $R_1$, $R_2$, $R_3$, $R_4$, $R_5$ and $R_6$ is an organic group containing at least one element selected from boron, silicon, oxygen, nitrogen, phosphorus, sulfur, fluorine, chlorine, bromine and iodine; each of said $R_1$, $R_2$, $R_3$, $R_4$, $R_5$ and $R_6$ is a substituent group; or at least two of the $R_1$, $R_2$, $R_3$, $R_4$, $R_5$ and $R_6$ adjacent to each other joined into a ring. Wherein, the structure of $R_1$, $R_2$, $R_3$ can be identical, it is also possible to be different. In one embodiment, the described organic group is alkyl, alkenyl, alkynyl, phenyl or aryl.

In one embodiment of the preparation method of the ionic liquid of the present invention, the phosphorous compound is at least one compound selected from a group consisting of methylphosphine, dimethylphosphine, trimethylphosphine, ethylphosphine, diethylphosphine, triethylphosphine, tripropylphosphine, di-tert-butylphosphine, tri-tert-butylphosphine, tri-butylphosphine, tri-n-pentylphosphine, cyclohexylphosphine, dicyclohexylphosphine, tricyclohexylphosphine, trihexylphosphine, trioctylphosphine, phenyl phosphine, diphenylphosphine, triphenylphosphine, dimethylphenylphosphine, diethyl phenyl phosphine, diphenyl-butylphosphine, tribenzylphosphine, tri (hydroxymethyl)phosphine, 2-chloroethane-diethylphosphine and tri(pentafluoroethyl) phosphine.

In one embodiment of the preparation method of the ionic liquid of the present invention, the proton compound is at least one compound selected from a group consisting of an inorganic oxyacid, an inorganic oxygen-free acid, an organic acid and a non-acid proton compounds. The proton compound of the present invention refers to the material that can provide a proton under certain conditions, where such proton would combine with a N element contained in nitrogenous compounds such as ammonia ($NH_3$), primary amine ($RNH_2$), secondary amine ($R_1R_2NH$), tertiary amine ($R_1R_2R_3N$), or where such proton would combine with a P element contained in hydrogen phosphide ($PH_3$), primary phosphine ($RPH_2$), secondary phosphine ($R_1R_2PH$), tertiary phosphine ($R_1R_2R_3P$).

In one embodiment of the preparation method of the ionic liquid of the present invention, the inorganic oxyacid is at least one inorganic oxyacid selected from a group consisting of $HAlO_2$, $HAl(OH)_4$, $H_3AsO_4$, $HAsO_2$, $H_3AsO_3$, $H_4As_2O_7$, $H_3BO_3$, $(HBO_2)n$, $H_2B_4O_7$, $HBO_3$, $H_5BW_{12}O_{40}$, $HBrO_3$, $HBrO_2$, $HBrO$, $HBrO_4$, $H_4CO_4$, $H_2C_2O_6$, $H_2CO_4$ or $H_2CO_3.H_2O_2$, $HClO_3$, $HClO_4$, $HClO_2$, $HClO$, $HONC$, $HOCN$, $HNCO$, $HIO_3$, $HIO$ or $IOH$, $HIO_4$, $H_5IO_6$, $H_4I_2O_9$, $HNO_3$, $HNO_2$, $H_3PO_4$, $H_5PO_5$, $(HPO_3)n$, $H_3PO_3$, $H_4P_2O_5$, $HPO_2$, $H_3PO_2$, $H_4P_2O_6$, $H_4P_2O_7$, $H_2SO_4$, $H_2SO_3$, $H_2S_2O_3$, $H_2S_2O_7$, $H_2SO_2$, $H_2SxO_6(x=2\sim6)$, $H_6SO_6$, $H_2S_2O_4$, $H_2SO_5$, $H_2S_2O_8$, $HSO_3Cl$, $HSO_3F$, $H_2SiO_3$ or $SiO_2.H_2O$, $H_4SiO_4$, $H_2Si_2O_5$ or $2SiO_2.H_2O$, $H_4Si_3O_8$, and $H_6Si_2O_7$ or $2SiO_2.3H_2O$.

In one embodiment of the preparation method of the ionic liquid of the present invention, the inorganic oxygen free acid is at least one inorganic oxygen free acid selected from a group consisting of carborane superacid ($CHB_{11}Cl_{11}$), $H_2S$, $H_2CS_4$, $H_2CS_3$, $HCN$, $HSeCN$, $HSCN$, $HBF_4$, $H_2SiF_6$, $HPF_6$, $HF$, $HCl$, $HBr$ and $HI$.

In one embodiment of the preparation method of the ionic liquid of the present invention, the organic acid is at least one organic acid selected from a group consisting of oxalic acid, methanoic acid, acetic acid, propionic acid, succinate, trifluoroacetic acid, trifluoromethanesulfonic acid, methanesulfonic acid, mandelic acid, methylsulphuric acid, ethylsulphuric acid, oleic acid, stearic acid, acrylic acid, maleic acid, citric acid, bis(catechol)boronic acid, bis(oxalate)boronic acid, bis(malonate)boronic acid, tris(pentafluoroethyl) trifluorophosphate, triethyltrifluorophosphate, tetracyanoboronic acid, tartaric acid, malic acid, citric acid, ascorbic acid, benzoic acid, benzenesulfonic acid, p-toluene sulfonic acid, salicylicacid, and caffeic acid.

According to the method of the present invention, the above-mentioned proton compounds also comprise the acid compounds having more choices, they are defined as non-acid proton compounds in the present invention. These compounds have active proton hydrogens, and their neighboring groups have very strong electron-attracting performance, which causes hydrogen atoms to exhibit greater activity. For example, the above-mentioned non-acid proton compounds can discharge active protons. In one embodiment of the preparation method of the ionic liquid of the present invention, the non-acid proton compound is an imine compound; wherein the structure of the imine compound is as the formula 1, formula 2 or formula 3 below:

$$HN(C_mF_{2m+1}SO_2)(C_nF_{2n+1}SO_2); \quad \text{Formula 1:}$$

$$HN(C_nF_{2n+1}SO_2)_2; \quad \text{Formula 2:}$$

$$HN(C_xF_{2x}SO_2)_2; \quad \text{Formula 3:}$$

wherein m is an integer of 0~5, n is an integer of 0~5, and x is an integer of 1~10.

In one embodiment of the preparation method of the ionic liquid of the present invention, the non-acid proton compound is at least one compound selected from a group consisting of

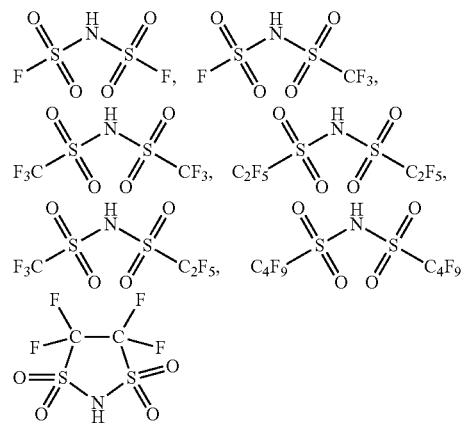

In one embodiment of the preparation method of the ionic liquid of the present invention, the non-acid proton compound is at least one compound selected from a group consisting of tri(triflouromethsulfentrazone)methane, phenol, p-methylphenol, β-naphthol, 2,4-dichlorophenol and p-aminophenol.

In one embodiment of the preparation method of the ionic liquid of the present invention, the carbonate ester is at least one ester selected from a group consisting of dimethyl carbonate, ethyl methyl carbonate, diethyl carbonate, ethylene carbonate, propylene carbonate, phenyl methyl carbonate, diphenyl carbonate and dibenzyl carbonate.

In the present invention, the type of proton compound used will have influence on the yield of final products. According to one embodiment of the present invention, acids with strong acidity tend to provide a high product yield, e.g. halogen acids wherein hydrochloric acid (HCl), hydrobromic acid (HBr), and hydroiodic acid (HI) all have strong acidity, and have high yields of products. In addition, same type of acids often has similar product yields, and inorganic acids such as fluoboric acid ($HBF_4$), and hexafluorophosphoric acid ($HPF_6$) have a similar product yield. Certainly, the factors that affect the product yield vary and also include the structure of the nitrogenous compound or the phosphorus compound and the structure of the carbonate ester.

In the invented method, the carbonate ester of the quaternary ammonium agent or the carbonate ester of the quaternary phosphonium agent can be represented as RO—CO—OR' (also referred to as an alkylation agent), wherein R, R' is selected from alkyl, alkenyl, alkynyl, phenyl or aryl which contains hydrocarbon independently; or R, R' is independently selected from the organic group which contains at least one element of the following: boron, silicon, nitrogen, phosphorus, oxygen, sulphur, fluorine, chlorine, bromine and iodine. The structures of R and R' can be identical or different; R, R' can be independent substitutent group, or R, R' can be neighboring groups joined into a ring.

Considering that the electron-donating/attracting effect and steric hindrance of substituent R, R' have influence on thermodynamics and dynamics of the alkylation reaction, in one embodiment, the carbonate ester is at least one selected from the following: dimethyl carbonate, methyl ethyl carbonate, diethyl carbonate, ethylene carbonate, propene carbonate, phenyl-methyl carbonate, diphenyl carbonate and dibenzyl carbonate; In another embodiment, the carbonate ester is selected from at least one of dimethyl carbonate, methyl ethyl carbonate and diethyl carbonate. Particularly when carbonate is ring-structured, multifunctional compounds could be obtained by the method in the present invention. For example, if ethylene carbonate or propene carbonate is added as an alkylation agent, it is possible for the final product to introduce ethoxy(—$CH_2CH_2OH$) or 2-hydroxyl propyl group (—$CH_2CHOHCH_3$) respectively. The introduction of the hydroxyl, on one hand, expands the application field of quaternary ammonium salts or quaternary phosphonium salts (because, for example, hydrophility or water-solubility is strengthened, which facilitates application in water-related fields); on the other hand, it facilitates "graft" for other functional groups to realize further functionalization on the basis of hydroxyl (for example, halogenation, etherification, esterification etc.), and it oxidization to a carboxylic acid is also possible.

In one embodiment of the preparation method of the ionic liquid of the present invention, the temperature range of said one-step reaction is 100~200° C. In one embodiment, the temperature range of said one-step reaction is 120~180° C. In another embodiment, the temperature of said one-step reaction is controlled in 140~160° C.

In one embodiment of the preparation method of the ionic liquid of the present invention, the absolute pressure of the described one-step reaction is 0.1~3.0 MPa. In one embodiment, the absolute pressure of described one-step reaction is 0.8~2.0 MPa. In another embodiment, the absolute pressure of described one-step reaction is 1.0~1.5 MPa. In practice, if the reaction exhibits obviously high exothermicity, it is better to slow down the feeding speed of a reactant, or to lower the temperature to cool down the reactor; If the reaction pressure increases too fast, it is also preferable to slow down the feeding spend of a reactant.

In one embodiment of the preparation method of the ionic liquid of the present invention, the reaction time of the described one-step reaction is controlled to 0.1~20 hours. In another embodiment, the reaction time of described one-step reaction is controlled to 4~15 hours. In yet another embodiment, the reaction time of described one-step reaction is controlled to 9~12 hours.

In the synthesis method of the present invention, the reaction can be carried out in certain solvents; it is also possible to carry out the reaction under solvent-free conditions. Using solvent facilitates uniform mixture of the reactants; in general, the use of solvent facilitates the reaction to be carried out at a lower reaction temperature or to get a high product yield. However, the introduction of solvents also can bring many potential problems, such as increased costs, potential safety hazards, and a requirement for recycle the solvents. The invented method requires no limitation on whether solvents are needed, nor does it limit the species of the solvents that may be used. If used, solvents can be selected from at least one of the following: alcohols (particular methanol, ethanol), ethers, ketones (acetone preferred), carbonates (dimethyl carbonate preferred), nitriles, alkanes, halogenated hydrocarbons and aromatic hydrocarbons. Further, solvents can also be selected from at least one of the following: methanol, ethanol, acetone and dimethyl carbonate.

According to a synthesis method according to the present invention, the mole ratio of the nitrogenous compounds (such as ammonia ($NH_3$), the primary amine ($RNH_2$), the secondary amine ($R_1R_2NH$), the tertiary amine ($R_1R_2R_3N$)) or phosphorous compounds (such as phosphide ($PH_3$), the primary phosphine ($RPH_2$), the secondary phosphine ($R_1R_2PH$), the tertiary phosphine ($R_1R_2R_3P$)) to the proton compounds depends on the number of protons which proton compounds can provide. Taking phosphorous compounds as an example, if one molecule of proton compound can only provide a proton, the mole ratio of phosphide ($PH_3$) or organic phosphoric compounds (comprising a primary phosphine $R_1PH_2$, a secondary phosphine $R_1R_2PH$, a tertiary phosphine $R_1R_2R_3P$) to proton compounds is preferably 1:1. For example, adding phosphide ($PH_3$) and hydrofluoric acid (HF) into a reactor with the mole ratio of 1:1. If one molecule of a proton compound can provide two or more protons, the mole ratio of phosphide ($PH_3$) or organic phosphoric compounds (comprising a primary phosphine $R_1PH_2$, a secondary phosphine $R_1R_2PH$, a tertiary phosphine $R_1R_2R_3P$) to the proton compounds can be 1:1, 2:1 or 3:1, for example, one molecule of a phosphoric acid can provide at most 3 protons, the triethyl phosphine and the phosphoric acid can be added into a reactor with a mole ratio of 1:1, 2:1 or 3:1 respectively. The mole ratio can deviate, and a certain reactant can be excessive. We can consider the factors including the cost of raw materials and whether it is easy to recycle residues etc. to select more favorable schemes, i.e., schemes with a performance of low financial cost and environmental friendliness, and decide what kind of raw materials to be excessive. Similarly, the mole ratio of nitrogenous compounds (such as ammonia ($NH_3$), the primary amine ($RNH_2$), the secondary amine ($R_1R_2NH$), the tertiary amine ($R_1R_2R_3N$)) or phosphorus compound (phosphide ($PH_3$), the primary phosphine ($RPH_2$), the secondary phosphine ($R_1R_2PH$), the tertiary phosphine ($R_1R_2R_3P$)) to carbonates is depending on the numbers of hydrogen atoms in compounds. For example, the mole ratio of $PH_3$ to a carbonate ester can be 1:4, the mole ratio of $RPH_2$ to a carbonate ester can be 1:3, the mole ratio of $R_1R_2PH$ to a carbonate ester can be 1:2, the mole ratio of $R_1R_2R_3P$ to a carbonate ester can be 1:1. In order to obtain a high product yield, the amount of carbonate esters can be beyond its normal level. Certainly, in order to ensure that the reaction carries out completely, the amount of those reactants with a lower boiling point and a lower cost can be beyond its normal level, and when the reaction is completed, they can be removed by washing, distillation or decompression distillation, recrystallization.

After the reaction of the present invention completes, it is possible to remove unreacted reactants and solvents by distillation, decompression distillation, recrystallization, and washing. Before the reaction starts, introducing an inert gas to displace air in the reactor or to vacuumize air from the reactor can help avoid air negatively influencing the reaction. One byproduct of the reaction is $CO_2$. While the reaction goes on, the amount of $CO_2$ increases continuously, which leads to pressure within the reactor rising continuously. To promote safety in production and help reduce costs (i.e. pressure vessel are classified by allowable pressure, and the higher the pressure is, the greater the cost of materials is, and the greater the requirement for air-tightness is, which also corresponds to higher costs), it is preferable to slowly add a certain reactant (in order to control the reaction speed) while releasing $CO_2$ via valves so that the pressure in the reactor is stabilized at a certain level. The method of conveying materials while releasing $CO_2$ is also helpful to improve the production capacity reacting in actual production. The equipment used in the method of the invention, in principle, can be all reactors or pressure vessels suitable for a liquid phase reaction. The material of the reactor is selected according to the physical-chemical property of reactants, it is preferable to use a material with acid-resisting, alkaline-resisting characteristics, for example, a stainless steel (such as 316L stainless steel) pressure vessel or a titanium material pressure vessel.

In one embodiment of the preparation method of the ionic liquid of the present invention, the cationic structure of the quaternary ammonium salt synthesized can be selected from following structure, but is not limited to following structure:

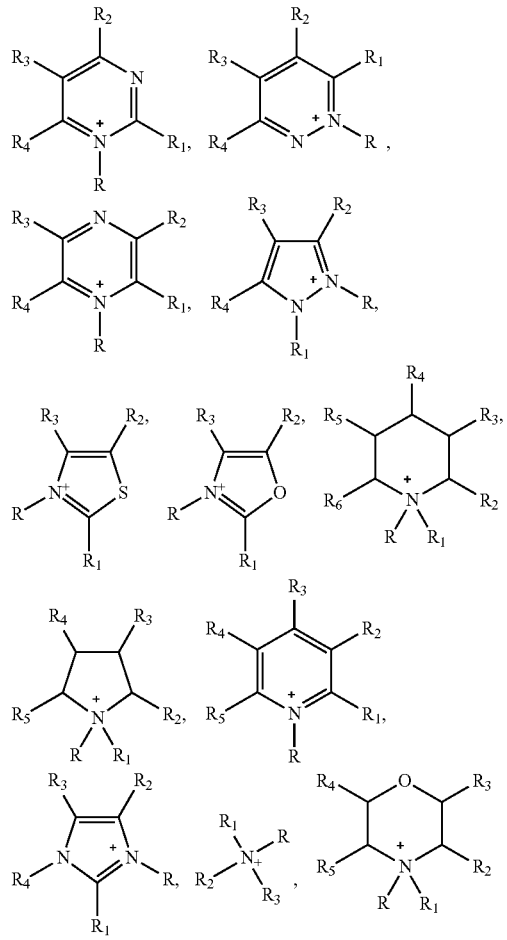

wherein each of said R, R', $R_1$, $R_2$, $R_3$, $R_4$, $R_5$ and $R_6$ is selected from alkyl, alkenyl, alkynyl, phenyl or aryl which contains carbon and hydrogen elements; or each of said R, R', $R_1$, $R_2$, $R_3$, $R_4$, $R_5$ and $R_6$ is selected from an organic group including at least one element of the following: boron, silicon, nitrogen, phosphorus, oxygen, sulfur, fluorine, chlorine, bromine and iodine. Wherein, the structure of $R_1$, $R_2$, $R_3$ can be identical, it can also be different, the $R_1$, $R_2$, $R_3$, $R_4$, $R_5$ and $R_6$ could be independent substituent groups; or at least two of $R_1$, $R_2$, $R_3$, $R_4$, $R_5$ and $R_6$ adjacent to each other joined into a ring.

In one embodiment of the preparation method of the ionic liquid of the present invention, the cationic structural of the synthesized quaternary ammonium salt can be selected from following structure, but is not limited to following structure:

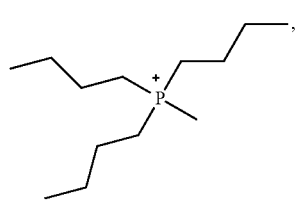

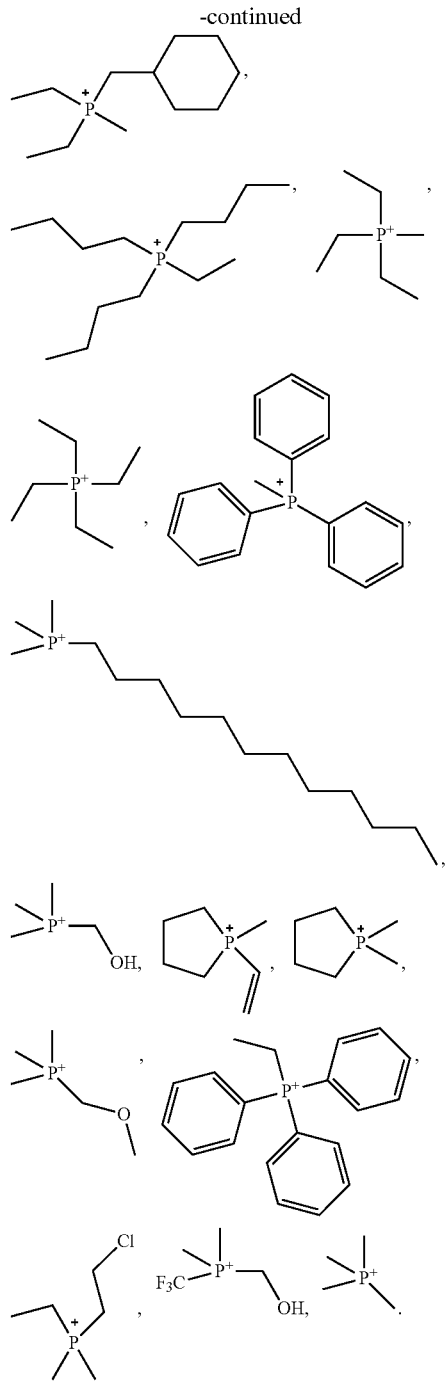

In one embodiment of the preparation method of the ionic liquid of the present invention, the cationic structure of the synthesized quaternary ammonium salt can be selected from following structure, but is not limited to following structure:

$PF_6^-$, $BF_4^-$, $SO_4^{2-}$, $NO_3^-$, $F^-$, $Cl^-$, $Br^-$, $I^-$, $PO_4^{3-}$, $ClO_4^-$, $SiF_6^{2-}$,

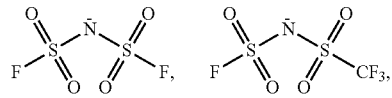

-continued

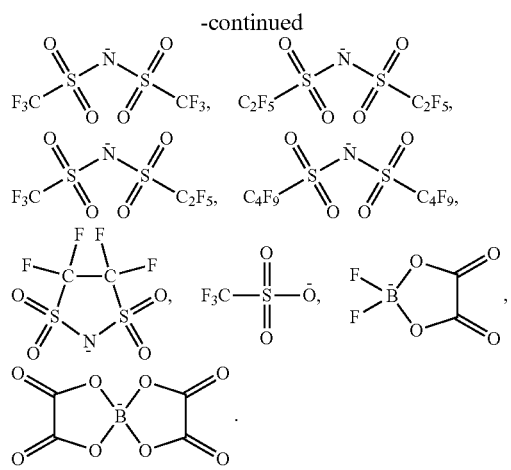

Besides the first objective of providing a one-step method for synthesizing ionic liquids, another objective of the present invention is to provide an electrolyte to be used for secondary batteries, and the electrolyte includes the ionic liquids prepared by the above-mentioned method.

At present, when electrolytes containing ionic liquids are applied to the lithium ion battery, significant problems faced include: (1) Poor compatibility with carbon-based active materials of negative electrodes such as graphite. Just because of this, the electrolytes containing the ionic liquids cannot carry out a reversible polarization, which makes it difficult for the electrolytes to show desirable lithium intercalation/deintercalation performance; (2) Low purity of ionic liquid. Ionic liquids are generally synthesized by a process of, first, tertiary amine compound is quaternized by alkyl halide, and then synthesized by anion-exchange with anions of an acid (HA) or a salt (MA); the ionic liquid synthesized by this method has the problem of halide ions residues in ionic liquids which greatly impacts application in secondary batteries because halide ions can corrode cell shells, current collectors, lugs, etc., leading to reduction of calendar life and circulation life-span of batteries; (3) poor wettability with a separator whose material is a nonpolar, low porosity commercial PP/PE/PP separator, which limits the performance of the ionic liquid electrolytes, causing deteriorated electrochemical properties in the lithium secondary cells which negatively affect practical application; (4) in the case of lithium-nickel-cobalt-manganese composite oxides or lithium-nickel-cobalt-aluminum composite oxides being used as active materials of the positive electrode, these oxides has a catalyzed oxidation effect on ionic liquids, which leads to increased side-reactions in batteries and occurs bulge or bloating, causing degradation of the circulating stability of the battery; (5) commercialized electrolyte (carbonates and LiPF6 system) contains trace HF (due to the corrosion of ionic liquid electrolytes to the aluminum collectors); HF will react with aluminum oxide on the surface of the aluminum current collector to generate $AlF_3$ protective film, such film will inhibit corrosion of the aluminum. However, in electrolytes containing the ionic liquids wherein the anion is bis(trifluoromethyl sulfonyl) imines ions or bisfluorosulfonimide ion, $AlF_3$ protective film cannot be formed on the surface of aluminum current collectors under general condition; therefore aluminum current collectors inevitably become corroded.

In order to realize the application of the ionic liquid electrolyte on the negative electrode with graphite as an active material, Chinese patent (patent publication No. is CN102138235A) provides a solution, wherein the active material of the positive electrode is $LiFePO_4$, adding 1%-10% vinyl ethylene carbonate (VEC) into the ionic liquid electrolyte, we could obtain a storage battery with reversible cyclicity. This overthrows the thesis that "it is impossible to apply ionic liquid electrolyte in a graphitic electrode". However, such solution is only limited to the positive electrode with $LiFePO_4$ as the active material, but it does not work for the active material of the positive electrode with a higher oxidation potential, such as lithium-nickel-cobalt-manganese composite oxides or lithium-nickel-cobalt-aluminum composite oxides. In order to improve the compatibility of ionic liquid electrolyte and the separator, Chinese patent (patent publication No. CN102903954A) discloses the synergistic effects between ionic liquid electrolyte (components, raw materials, characteristics) and the specific separator (substrate of the specific separator is a polar organic polymer, and it has a structure of porous 3D mesh and an air permeability of 150-500 S/100 CC). Such synergistic effects can make full use of respective advantages to improve the current performance of ionic liquid. However, the Chinese patent only focuses on matching between the ionic liquid electrolyte and the separator; it fails to provide a complete solution which takes the features of the positive electrode, the negative electrode, and the current collector into concern. In addition, many documents mention that ionic liquid electrolyte is applied to the lithium ion battery to improve security, but specific requirements on the purity of the ionic liquid electrolyte have seldom been put forward, especially as to the residue amount of halide ions.

In order to solve the problem, the third objective of the present invention is to provide a secondary cell, which comprises a positive electrode, a negative electrode, a separator and an electrolyte, and the electrolyte comprises ionic liquids prepared by the preparation method of the ionic liquid mentioned above. The ionic liquid prepared by the method of the present invention has a high purity. Therefore there is little or no halide ions residue issue, which greatly increases the service life of the secondary cells.

Residue of halide ions in ionic liquids has a great influence on their application in secondary batteries. Halide ions may corrode the cell shells, current collectors, and lugs, etc., and may further affect the circulatory characteristics of secondary cells and shorten cycle life-span. Chinese patent (publication number CN101379653) emphasizes the importance of the purity of ionic liquid electrolyte, and restricts the impurity content of halide ions, but does not point out how to obtain the ionic liquid without any halide ion. The present invention provides a one-step reaction method to synthesize ionic liquids from carbonate esters, which act as the alkylating agents. As shown in embodiment 14, taking N-n-propyl pyrrolidone, dimethyl carbonate and bis(trifluoromethyl sulfonyl) imine as reactants, 1-methyl-1-propylpyrrolidinium bis(trifluoromethylsulfonyl)imide salt can be synthesized by the one-step reaction method. Since the synthesis process does not involve halogenated hydrocarbons, and avoids anion exchange reaction, there will not be residue of halogen ions and alkali metal ions in the synthesized ionic liquid. After the ionic liquid electrolyte is prepared, the content of halide ions ($Cl^-$, $Br^-$, $I^-$) therein is less than or equal to 5 ppm.

In one embodiment of the present invention, the cation of the ionic liquid is 1-methyl-1-propylpyrrolidinium ion, 1-methyl-1-butylpyrrolidinium ion, 1-methyl-1-propylpiperidinium ion, or 1-methyl-1-butylpiperidinium ion. In addition, it is proved by multiple experiments that in the present invention, the ionic liquid is preferred to be synthesized through a one-step reaction at the circumstance of carbonate esters being alkylation agents. When pyrrolidines or piperidines are tertiary amines, the yield is higher. For example, in embodiment 14, under nitrogen atmosphere, firstly N-n-propyl pyrrolidine (500 g) and 1000 ml dimethyl carbonate are together added into a pressure vessel. Then bis(trifluoromethylsulfonyl)imide (1243 g) is slowly added therein, and during that process the temperature is kept no higher than 60° C. After that addition, they react for 20 hours under 150° C. and about 1.6 MPa. During the reaction, part inner gas is released out via air evacuation valves to avoid excess pressure. After reaction, removing low boiling substances by decompression, washing the remains and drying in vacuum to obtain N-methyl-N-propylpyrrolidinium bis(trifluoromethylsulfonyl)imide with a yield of 98% or above. In one embodiment, in order to obtain ionic liquids with high purity and low cost, the cation of ionic liquid of the present invention is preferably to be a pyrrolidinium ion or a piperidium ion. Theoretically, if carbonate ester is selected as an alkylation agent, introduction of halide ions would be completely avoided, i.e., the content of halide ions in ionic liquid electrolyte is zero. However, since there may be halide ion contamination during the preparation process of raw materials such as pyrrolidine, piperidine and carbonate esters, it is required that pyrrolidine, piperidine and carbonate esters should be purified by distillation before reaction, and the content of halide ions should be no higher than 3 ppm. For the electrolyte of the lithium secondary cell, moisture content in carbonate ester/LiPF$_6$ system has currently decreased to 5 ppm from 20 ppm of years ago. Moisture has a very serious effect on the performance of the lithium battery, and one molecule of water generates at least one molecule of HF. HF is the main cause to the phenomenon of internal resistance increasing and bulge occurring in batteries. Comparatively, the hazards of halide ions on batteries would be no less than that of moisture. Therefore, the content of halide ions in ionic liquid electrolytes should also be required to be less than 5 ppm, to meet the requirements of the long battery lifespan.

In one embodiment, said electrolyte comprises lithium salts and basic components; and said basic components comprise ionic liquids; The cation of the structure of said ionic liquid is at least one selected from the following:

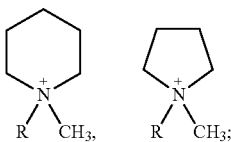

Wherein, R is alkyl.

In one embodiment, the cation of ionic liquids is a pyrrolidinium ion or a piperidinium ion. Five-membered heterocycles or hexa-membered heterocycles have a stable structure, which helps extend the lifespan of secondary batteries. Unlike common quaternary ammonium ions, two substituent groups on nitrogen joined into a ring, which reduces the space steric hindrance existed between four substitutent groups, reduces mutual "winding" between substituted alkyls, and facilitates the decrease of ionic liquids viscosity, thereby improving the charge-discharge performance of the ionic liquid electrolytes.

In another embodiment, the cation is at least one ion selected from 1-methyl-1-propylpyrrolidinium ion, 1-methyl-1-butylpyrrolidinium ion, 1-methyl-1-propylpiperidinium ion, or 1-methyl-1-butylpiperidinium ion.

In yet another embodiment, the intercalation/deintercalation potential of the active material of the negative electrode is not lower than 0.25V (vs. Li/Li+).

In one embodiment, said active material of the negative electrode is silicon-carbon material or silicon-alloy material, and the carbon contained in said silicon-carbon material is not graphite.

In another embodiment, said silicon-alloy material is at least one material selected from silicon-copper based material and silicon-tin based material.

In one embodiment, said active material of the negative electrode is a titanium-based oxide.

In another embodiment, said titanium-based oxide is a lithium titanate (Li—Ti) oxide.

In still another embodiment, the content of halide ions in said electrolyte is less than or equal to (≤)5 ppm.

In yet another embodiment, said lithium salt is selected from lithium hexafluorophosphate, lithium tetrafluoroborate, lithium trifluoromethyl sulfonic acid lithium perchlorate, lithium hexafluoroarsenate, lithium bis(catechol) borate, lithium bis(malonato)borate, lithium bis(oxalate)borate, lithium tri(catechol)phosphate, lithium tri(perfluoroethyl)trifluorophosphate, lithium trifluoromethanesulfonate, lithium bis(trifluoromethylsulfonyl)imide and lithium bisfluorosulfonylimide.

In one embodiment, said lithium salt is at least one salt selected from the first type of lithium salt and at least one selected from the second type of lithium salt; said first type of lithium salt comprises lithium trifluoromethanesulfonate, lithium bis(trifluoromethylsulfonyl)imide and lithium bisfluorosulfonylimide; said second type of lithium salt comprises lithium hexafluorophosphate and lithium tetrafluoroborate. In another embodiment, the mass of said first type of lithium salt accounts for 0.5~30% of the total mass of said electrolyte, and the mass of said second type of lithium salt accounts for 0.5~30% of the total mass of said electrolyte.

In one embodiment, the mole ratio of said first type of lithium salt to said second type of lithium salt is 1:19~19:1. In another embodiment, the mole ratio of said first type of lithium salt to said second type of lithium salt is 1:9~9:1. In yet another embodiment, the mole ratio of said first type of lithium salt to said second type of lithium salt is 3:7~7:3.

The reasons for selecting two or more types of lithium salt are that: when using mixed lithium salts, the physical properties of ionic liquid electrolyte could be adjusted, e.g. by decreasing its melting point to broaden its using temperature range; and also that the second type of lithium salt, such as lithium hexafluorophosphate or lithium tetrafluoroborate can be hydrolyzed under the existence of trace water to produce trace HF. HF would react with $Al_2O_3$ on aluminum current collectors to generate $AlF_3$, thereby protecting the current collectors from corrosion. Since the industry process to produce lithium hexafluoro phosphate is mature and productive at extremely low cost, it is preferred to select lithium hexafluorophosphate in the composition of mixed lithium salt and use more lithium hexafluorophosphate whenever possible. However, using excessive lithium hexafluorophosphate may lead to physicochemical property changes of the ionic liquid electrolytes, such as crystallization under a low temperature. The amount of lithium hexafluoro phosphate used has close ties with the anion structure of the ionic liquid. If the anion is bis(trimethylfluorosulfonyl)imine ions, the amount of lithium hexafluorophosphate used can appropriately increase; If the anion is trifluoromethanesulfonate, the lithium hexafluoro phosphate should be used as less as possible, lithium tetrafluoroborate is would be a better choice. Certainly, in order to regulate physicochemical properties and the electrochemical properties of the ionic liquid electrolyte, a third lithium salt can also be added, and can be used as an electrolyte, or act as an additive. For example, when adding a small amount of lithium salt, such as LiBOB or LiODBF been adding into the ionic liquid electrolyte, it is possible to form a SEI film with special properties on the surface of the silicon-based negative electrode.

In one embodiment, the basic components also comprise the organic solvent; said organic solvent is at least one of a carbonate ester, a carboxyl ester, a sulfite ester, a sulfonic ester, a sulfone, an ether, an organosilicon, a nitrile and a fluorophosphazene. In another embodiment, said organic solvent is at least one selected from methyl propylene carbonate, ethyl propylene carbonate, methyl phenol carbonate, ethylene carbonate, halogenated ethylene carbonate, propylene carbonate, butylene carbonate, dimethyl carbonate, diethyl carbonate, methyl ethyl carbonate, methyl propyl carbonate, vinylene carbonate, ethylene sulfite, propylene sulfite, butylene sulfite, dimethyl sulfite, diethyl sulfite, dimethyl sulfoxide (DMSO), ethyl methyl sulfoxide, 1, 3-propanesultone, 1, 4-butane sultone, 1,3-dioxolane, 2,2-dimethoxypropane, ethyloxyl pentafluorophosphazene, phenoxypentafluorophosphazene, hexanedinitrile and succinonitrile.

In one embodiment, said basic component also comprises a film forming agent, and said film forming agent is at least one selected from sulfur dioxide, ethylene sulfite (VS), vinylene carbonate (VC), sulfurous ester, sulfoxide, sulphonic ester, halogenated organic ester, unsaturated organic compound containing vinylidene, organic boron compound, lithium carbonate ($Li_2CO_3$) and lithium bis(oxalate)borate (LiBOB).

In one embodiment, said basic component also comprises a functional additive; Said functional additive should be at least one of anti-overcharge additive (or overcharge protection additive), fire-retardant additive, conductive additive and high pressure resistant additive. In another embodiment, said functional additive is biphenyl (DP), cyclohexyl benzene (or written as phenylcyclohexane), aryladamantane, naphthalene derivates, polybenzene, trimethylphosphate (TMP), triphenylphosphate (TPP), tris(2,2,2 trifluoroethyl) phosphite, para-dinitrogen(hybrid)benzene, tri(pentafluorophenyl) boron, ethyoxyl pentafluorophosphazene, phenoxypentafluoro phosphazene, hexanedinitrile and succinonitrile.

In one embodiment, said basic component comprises the ionic liquid of 70~100 wt. %, the organic solvent of 0~30 wt. %, the film forming agent of 0~10 wt. %, and the functional additive of 0~10 wt. %.

In one embodiment, the active material of the positive electrode is at least one material selected from a lithium-nickel-cobalt-manganese composites oxide, a lithium-nickel-cobalt composite oxide, a lithium-nickel-cobalt-aluminum composite oxide, a lithium-manganese-nickel composite oxide, a lithium-phosphorous oxide, a lithium-cobalt oxides and a lithium-manganese composite oxide. Said lithium-manganese-nickel composite oxide has spinel structure, and said lithium-phosphorous oxide has olivine structure.

There are more choices to the active material of the positive electrode contained in the secondary cell of the present invention. It can be at least one of the following: a lithium-nickel-cobalt-manganese composite oxide, a lithium-nickel-cobalt composite oxide, a lithium-nickel-cobalt-aluminum composite oxide, a spinel type lithium-manganese-nickel composite oxide, a olivine-structured lithium-phosphorous oxide, a lithium-cobalt oxides and a lithium-manganese composite oxide. In one embodiment, the active material of positive electrode is a material which can improve working voltage and has high electrochemical stability, for example, the lithium-nickel-cobalt-manganese composite oxide NCM(333), the lithium-nickel-cobalt-manganese composite oxide NCM(442), the lithium-nickel-cobalt-manganese composite oxide NCM(523) etc.

In one embodiment, the separator is at least one of an ethylene glycol terephthalate separator, a polyacrylonitrile separator and a polyvinylidene fluoride separator. Since the ionic liquid is a polar material, the selection of the polar separator facilitates fully submerging the separator in the electrolyte.

In one embodiment, the average pore size of said separator is 1~25 μm; the pore porosity of said separator is 50~85%. The higher the pore porosity is, the more the holding amount of the electrolyte is. A greater holding amount is more suitable for ionic liquid electrolyte with higher viscosity.

BRIEF DESCRIPTION OF THE DRAWINGS

The above objects and advantages of the present application will become more readily apparent to those ordinarily skilled in the art after reviewing the following detailed description and accompanying drawings, in which.

DETAILED DESCRIPTION OF PREFERRED EMBODIMENTS

Figure 1A:
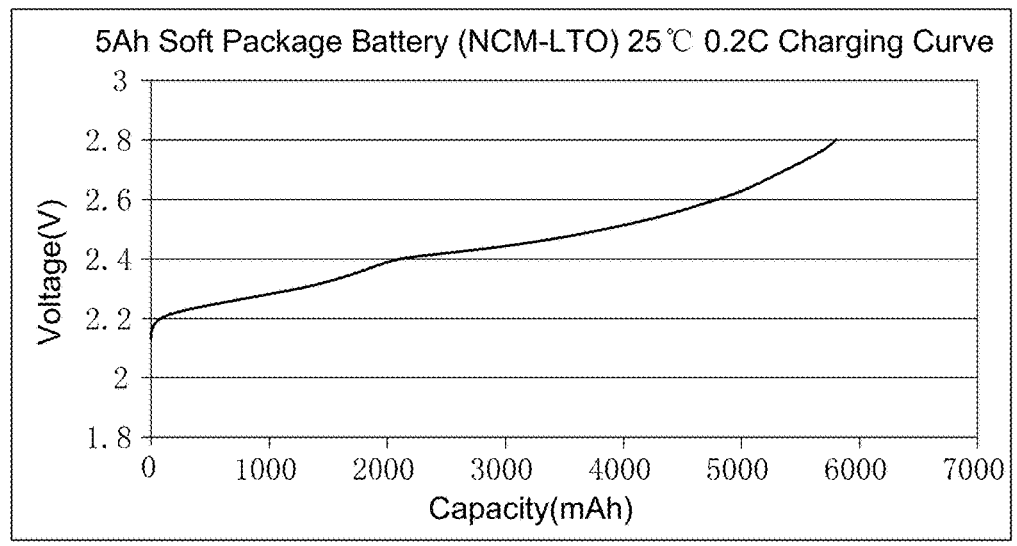
FIG. 1a illustrates the charging curve of the secondary battery prepared by embodiment 14.

The present application will now be described more specifically with reference to the following embodiments. It is to be noted that the following descriptions of preferred embodiments of this invention are presented herein for purpose of illustration and description only. It is not intended to be exhaustive or to be limited to the precise form disclosed.

There is no limitation to the structure of the lithium secondary battery in the present invention, it could be cylindrical, square or button in shape, flexible-packaged or packed in steel shell or aluminum shell. The embodiments of the present invention adopt button-shaped lithium-ion secondary cell (CR2025) and flexible packed lithium ion battery. There are more choices of active material of the positive electrode, which can be selected from at least one of the following: lithium-a nickel-cobalt-manganese composite oxide, a lithium-nickel-cobalt composite oxide, a lithium-nickel-cobalt-aluminum composite oxide, a spinel type lithium-manganese-nickel composite oxide, and a olive-structured lithium-phosphorus oxide, a lithium-cobalt oxide and a lithium-manganese composite oxide. The lithium intercalation/de-intercalation potential of active material of the negative electrode is not lower than 0.25V (vs.Li/Li+), and the active material of the negative electrode can be selected from materials other than carbon materials such as graphite (natural or artificial), lithium titanate, crystalline silicon, carbon silica composites, silicon-copper composite, and silicon-tin composites etc.

Embodiment 1:
Triethylamine ($Et_3N$, 606 g) and 100 mL of dimethyl carbonate were added into a pressure vessel together under nitrogen atmosphere, concentrated sulfuric acid ($H_2SO_4$, 300 g, 98%) was then added under cooling measures. After addition, the mixture was heated to 200° C., during this process the pressure increased. If the reaction pressure exceeded 3.0 MPa, then to prevent any further increase in reaction pressure by using an air evacuation valve. The reaction continued for 0.2 h. After reaction, cooling to room temperature, removing low boiling substance under decompression and washing the remains, the reaction yielded N-methyl-N-triethylammonium sulfate (950 g).

Embodiment 2:
N-n-propyl pyrrolidine (500 g) and 1000 mL of dimethyl carbonate were added into a pressure vessel together. Bis(trifluoromethylsulfonyl)imide (1234 g) was slowly added under nitrogen atmosphere. During the process above, the temperature was kept no higher than 60° C. After addition, the mixture was reacted under 150° C. and 1.6 MPa for 20 h. During the reaction, some of the gas inside the vessel was released by the air evacuation valve to avoid excess pressure. After reaction, cooling to room temperature and removing low boiling substance under reduced pressure, and then washing the remains, the reaction yielded N-methyl-N-propylpyrrolidinium bis(trifluoromethylsulfonyl) imide (1675 g).

Embodiment 3:
N-n-propyl pyrrolidine (500 g), dimethyl carbonate (500 g) and 500 mL of methanol were added into a pressure vessel, then raising the temperature to 120° C. After that, feeding bis(trifluoromethylsulfonyl)imide (1236 g) into the reactor with certain flow, during which process the temperature in the reactor was kept at 120~130° C. and the feeding continue for 12 h. After feeding of the predetermined amount of bis(trifluoromethylsulfonyl)imide, the temperature was increased up to 150° C. and reaction continued for 2 h. During the reaction, if the reaction pressure exceeded 2.6 MPa, some of the gas inside the vessel was released by the air evacuation valve to avoid excess pressure. After reaction, cooling to room temperature and removing low boiling substance under reduced pressure, and washing the remains washed, the reaction yielded N-methyl-N-propylpyrrolidinium bis(trifluoromethyl sulfonyl)imide (1704 g).

Embodiment 4:
N-n-butylpyrrolidine (500 g) was added into a pressure vessel. A mixture of trifluoromethanesulfonic acid (TFMS, 585 g) and 1000 mL of dimethyl carbonate were slowly added under nitrogen ($N_2$) atmosphere, with the temperature maintained no higher than 60° C. After addition, reacting under 140° C. and about 1.5 MPa for 15 hours. During the reaction, some of the gas inside the vessel was released by the air evacuation valve to avoid excess pressure. After reaction, removing low boiling substance under decompression, the reaction yielded N-methyl-N-n-butyl pyrrolidinium trifluoromethanesulfonate (1006 g).

Embodiment 5:
Under nitrogen atmosphere, N-ethyl imidazole (298 g) was added into a pressure vessel. Methanol solution of tetrafluoroboric acid (682 g, 40%) was slowly added, with the temperature maintained no higher than room temperature during the process. After addition, 600 mL of dimethyl carbonate was added. Raising temperature to 180° C., and reacting under about 1.5 MPa for 3 hours. During the reaction, some of the gas inside the vessel was released by the air evacuation valve to avoid excess pressure. After reaction, removing low boiling substance under decompression, the reaction yielded 1-methyl-3ethyl imidazolium tetrafluoroborate (574 g).

Embodiment 6:
Under nitrogen protection, bis(trifluoromethylsulfonyl) imide (125 g) was added into a pressure vessel, slowly adding tri-n-butyl phosphine (89 g) and 150 mL of dimethyl carbonate were also slowly added, with the temperature maintained no higher than room temperature in the process. After addition, raising temperature to 180° C. and reacting under about 1.5 MPa for 5 hours. After reaction, removing low boiling substances under decompression, the reaction yielded methyltributylammonium bis(trifluoromethanesulfonyl)imide (214 g).

Embodiment 7:
Under nitrogen protection, triphenyl phosphine (115 g), 150 mL of dimethyl carbonate and bis(trifluoromethylsulfonyl)imide (125 g) were added into a pressure vessel. Raising temperature to 180° C. and reacting under about 1.5 MPa for 4 hours. After reaction, removing low boiling substances under decompression, the reaction yielded methyltriphenylphosphonium bis(trifluoromethanesulfonyl) imide (240 g).

Embodiment 8:
Under nitrogen protection, triphenyl phosphine (115 g) and bis(trifluoromethylsulfonyl) imide (125 g) were added into a pressure vessel, 150 mL of diethyl carbonate was then added. After addition, raising temperature to 180° C., and reacting under about 2.5 MPa for 5 hours. After reaction, removing low boiling substance by decompressing, the reaction yielded ethyltriphenylphosphonium bis(trifluoromethanesulfonyl) imide (236 g).

Embodiment 9:

Under nitrogen protection, bis(trifluoromethylsulfonyl) imide (152 g) was added into a pressure vessel, diphenyl phosphine (100 g) and 150 mL of diethyl carbonate were slowly added thereinto. After addition, raising temperature to 180° C., and reacting under about 2.0 MPa for 5 hours. After reaction, removing low boiling substance by decompression, the reaction yielded diethyldiphenylphosphonium bis(trimethylmethanesulfonyl)imide (262 g).

Embodiment 10:

Under nitrogen protection, n-octylamine (100 g) and 250 mL of dimethyl carbonate were added into a pressure vessel, concentrated sulfuric acid (39 g, 98%) was then slowly added at a temperature no more than 60° C. After addition, raising temperature to 180° C., and reacting under about 0.5 MPa for 8 hours. After reaction, removing low boiling substance by decompression, the reaction yielded trimethyl-octylammonium hydrogen sulfate (159 g).

Embodiment 11:

Under nitrogen protection, dioctylamine (1200 g) and 2000 mL of dimethyl carbonate were added into a pressure vessel, hydrogen chloride gas (180 g) was then slowly added, keeping the reaction temperature no higher than 60° C. After reaction, removing low boiling substance under reduced pressure, the reaction yielded dimethyl-dioctylammonium hydrochloride (1070 g).

Embodiment 12:

Under argon atmosphere, phosphine (100 g), 100 g ethylene carbonate and ethanol solution of hydrogen chloride (55 g; 33%) were added into a pressure vessel together; raising temperature to 160° C., and reacting for 3 hours under about 1.5 MPa; After reaction, removing low boiling substance under reduced pressure, the reaction yielded 2-hydroxyethyl-tributylphosphonium hydrochloride (138 g).

Embodiment 13:

Under argon atmosphere, n-hexylamine (300 g) and 500 g dimethyl carbonate were added into a pressure vessel together. Raising temperature to 120° C., bis(fluorosulfonyl) imide (538 g) was then added under certain flow. Then heating to 160° C. and continue reacting for 3 hours. During the reaction, if the reaction pressure exceeded 1.6 MPa, some of the gas inside the vessel was released by air evacuation valve to avoid excess pressure. After reaction, cooling to room temperature, removing low boiling substance under decompression and washing the product, the reaction yielded trimethyl-n-hexyl-ammonium bis(fluorosulfonyl)imide (753 g).

Embodiment 14:

The synthesis of ionic liquid: N-n-pro-pyl pyrrolidine (500 g) and 1000 ml dimethyl carbonate was added into a pressure vessel together. Under nitrogen atmosphere, bis (trifluoromethylsulfonyl)imide (1243 g) was slowly added, with a temperature no more than 60° C. After addition, reacting for 20 hours under 150° C. and about 1.6 MPa. During the reaction, some of the gas inside the vessel was released by an air evacuation valve to avoid excess pressure. After reaction, removing low boiling substance under reduced pressure. The product was washed and dried in vacuum, then the reaction yielded N-methyl-N-propylpyrrolidinium bis(trifluoromethylsulfonyl)imide.

The preparation of ionic liquid electrolyte: Mixing N-methyl-N-propylpyrrolidinium bis(trifluoromethylsulfonyl)imide ($Pr_{1,3}TFSI$) and propylene carbonate (PC) by a mass ratio of 85:15 to get a homogeneous solution. And then adding $LiPF_6$ and lithium bis(trifluoromethylsulfonyl)imide (LiTFSI), mole ratio of the two lithium salts was 1:7. The mixture was dissolved to form an electrolyte solution (0.8 mol/L). Detecting and analyzing by ion chromatograph and ICP means, the result showed that in the electrolyte, the content of halide ions ($Cl^-$, $Br^-$, $I^-$) was less than 5 ppm.

The assembly of the non-aqueous electrolyte secondary battery: Respectively taking active materials (the active material of the positive electrode was nickel-cobalt-manganese ternary (523), the active material of the negative electrode was lithium titanate $Li_4Ti_5O_{12}$ (LTO)), the conductive agent (conductive carbon black) and the binder (PVDF) according to a certain mass ratio, and then mixing them up uniformly. Adding solvent N-methylpyrrolidone and further mixing up uniformly, therefore preparing a slurry with a solid content 60%. And then coating the slurry onto an aluminum foil current collector, after drying and rolling, punching into plates. Polyethylene terephthalate is chosen as separator (PET separator), its average pore diameter is above 1 μm, and its porosity is above 65%. Assembling the elements above into a flexible-packed battery in an industry drying house, where humidity was strictly controlled, its designed capacity was 5 Ah.

Figure 1B:
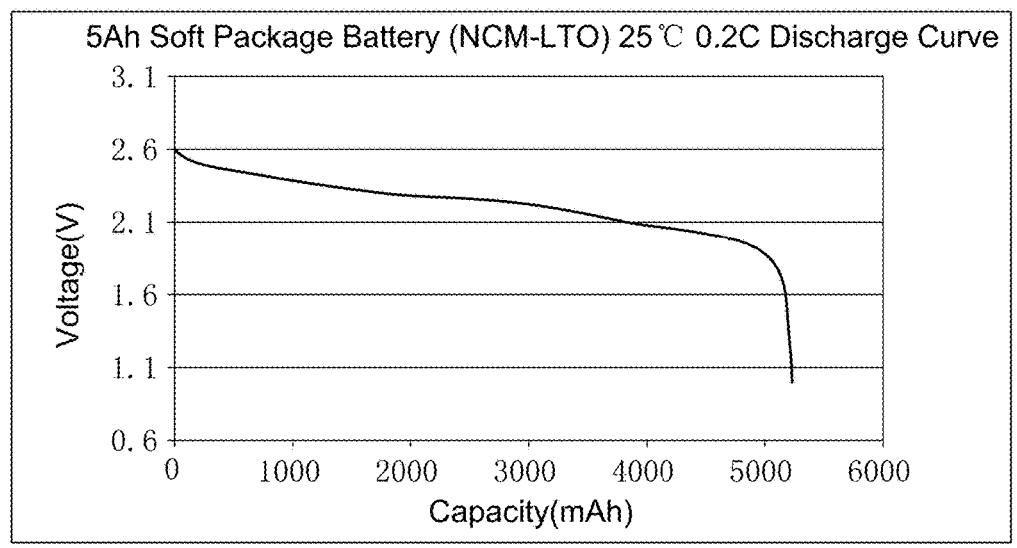
FIG. 1b illustrates the discharge curve of the secondary battery prepared by embodiment 14.
Figure 2:
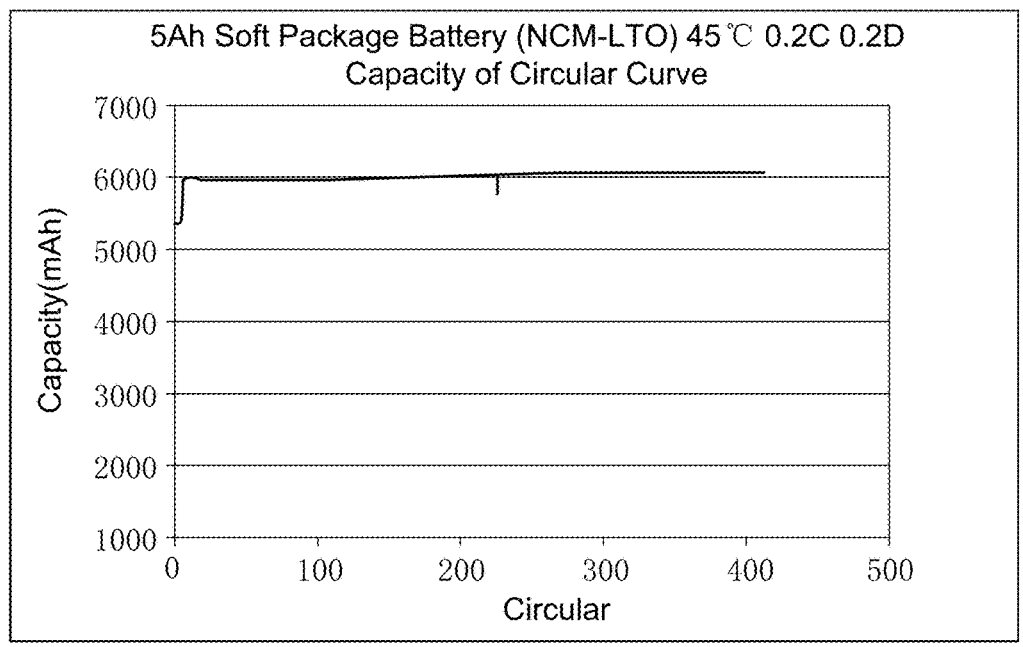
FIG. 2 illustrates the cycle life-span curve of the secondary battery prepared by embodiment 14.

Battery performance test: Charging and discharging the above flexible-packed battery within a voltage range of 1.0~2.8V under 25° C. environment temperature, with a constant current charge rate 0.2C, and a constant current discharge rate 0.2C. Battery capacity performance was investigated, as shown in FIGS. 1a and 1b. Charging and discharging the above flexible-packed battery within a voltage range of 2.0V~2.8V under 45° C. environment temperature, with a charge-discharge rate 0.2C. Its cycling stability was investigated, see FIGS. 1a, 1b and FIG. 2.

Embodiment 15:

The synthesis of the ionic liquid was the same as that in embodiment 14.

The preparation of the ionic liquid electrolyte: Mixing N-methyl-N-propylpyrrolidinium bis(trifluoromethyl sulfonyl)imide ($Pr_{1,3}TFSI$), propylene carbonate (PC), fluoroethylene carbonate (FEC) and vinyl carbonate (VC) according to a mass ratio of 85:10:3:2 and forming a homogeneous solution. And then adding $LiPF_6$ and lithium bis(trifluoromethylsulfonyl)imide, the mole ratio of the above lithium salts is 4:4. The mixture was dissolved to form an electrolyte solution (0.8 mol/L). Detecting and analyzing by ion chromatograph and ICP means, the result showed that in the electrolyte, the content of halide ions ($Cl^-$, $Br^-$, $I^-$) was less than 5 ppm.

The assembly of the non-aqueous electrolyte secondary battery: Respectively taking active materials (the active material of the positive electrode was nickel-cobalt-aluminum material (NCA, Ni:Co:Al=80:15:5), and the active material of the negative electrode was silicon carbon composite), conductive agent (conductive carbon black), and binder (PVDF) according to a certain mass ratio, and then mixing them up uniformly. Adding solvent N-methylpyrrolidone and further mixing up uniformly, therefore preparing a slurry with a solid content 60%. And then coating the slurry onto an aluminum foil current collector, after drying and rolling, punching into plates. We chose PET separator, its average pore diameter is above 1 μm, and its porosity is above 65%. Assemble them into a flexible-packed battery in an industry drying house where humidity was strictly controlled, its designed capacity was 5 Ah.

Figure 3:
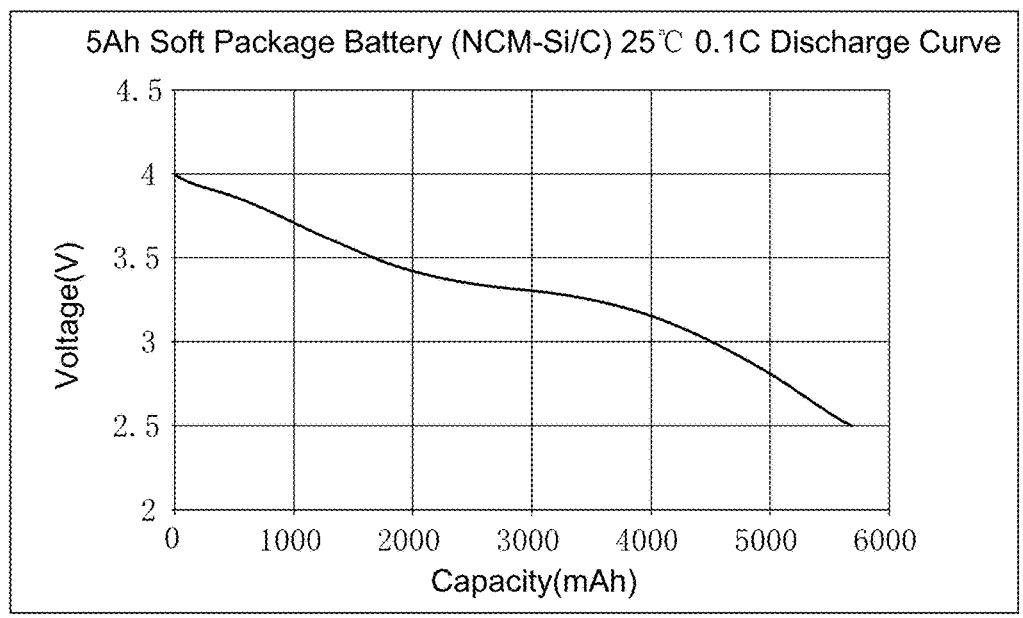
FIG. 3 illustrates the discharge curve of the secondary battery prepared by embodiment 15.

Battery performance test: Charging and discharging the above flexible-packed battery within a voltage range of 2.5V~4.1V under 25° C. environment temperature, with a constant current charge rate 0.1C, and a constant current discharge rate 0.1C. Battery discharge performance was investigated, as shown in FIG. 3.

Embodiment 16:

The synthesis of the ionic liquid and the preparation of the ionic liquid electrolyte were the same as that in embodiment 14, the difference lies in that during the preparation of the ionic liquid electrolyte, vinyl carbonate (VC) was replaced by sultone (1,3-PS).

The assembly of the non-aqueous electrolyte secondary battery: Respectively taking active materials (the active material of the positive electrode was nickel-cobalt-manganese ternary material (523), and the active material of the negative electrode was silicon-copper composite), the conductive agent (conductive carbon black), and the binder (PVDF) according to a certain mass ratio, and then mixing them up uniformly. Adding solvent N-methylpyrrolidone and further mixing up uniformly, therefore preparing a slurry with a solid content 60%. And then coating the slurry onto an aluminum foil current collector, after drying and rolling, punching into plates. We chose PET separator, whose average pore diameter is above 1 μm, and whose porosity is above 65%. Assembling them into a flexible-packed battery in an industry drying house where humidity was strictly controlled, its designed capacity was 4 Ah.

Figure 4:
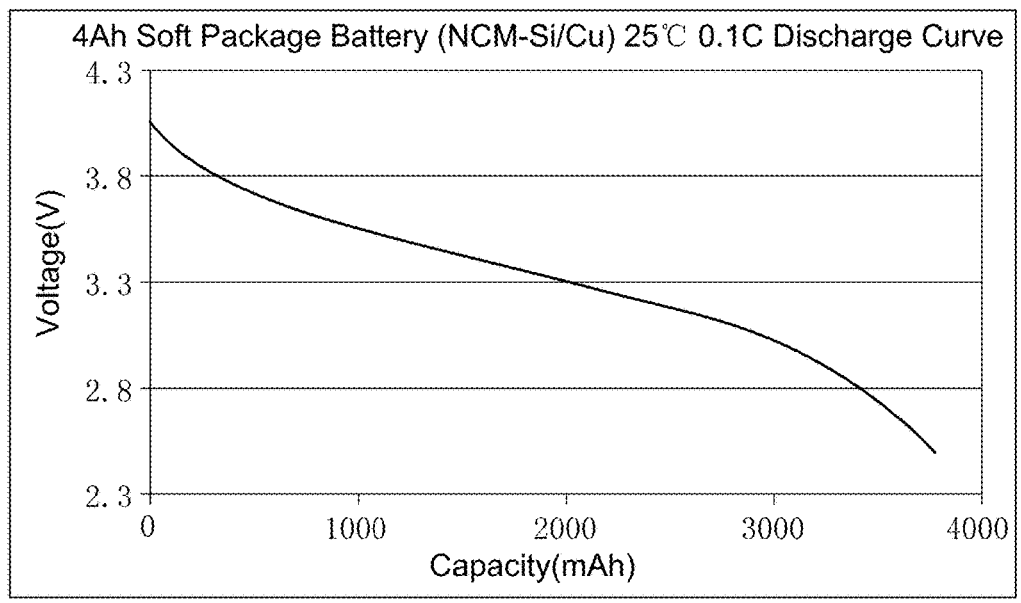
FIG. 4 illustrates the discharge curve of the secondary battery prepared by embodiment 16.

Battery performance test: Charging and discharging the above flexible-packed battery within a voltage range of 2.5V~4.1V under 25° C. environment temperature, with a constant current charge rate 0.1C, and a constant current discharge rate 0.1C. Battery discharge performance was investigated, as shown in FIG. 4.

Embodiment 17:

The synthesis of the ionic liquid: N-n-propyl pyrrolidine (500 g), dimethyl carbonate (500 g) and 500 mL methanol were added into a pressure vessel, then raising temperature to 120° C. After that, bis(trifluoromethylsulfonyl)imide (1243 g) was added into the reactor at certain flow, during which process the temperature in the reactor was kept at 120~130° C. and the feeding continued for 12 hours. After addition, increasing the temperature to 150° C. and reacting for 2 hours. During the reaction, if the reaction pressure exceeded 2.6 MPa, some of the gas inside the vessel was released by an air evacuation valve to avoid excess pressure. After reaction, cooling to room temperature and removing low boiling substance under reduced pressure, and then the remains were washed, finally the reaction yielded N-methyl-N-propylpyrrolidinium bis(trifluoromethylsulfonyl)imide.

The preparation of the ionic liquid electrolyte: Mixing N-methyl-N-propylpyrrolidinium bis(trifluoromethylsulfonyl)imide ($Pr_{1,3}TFSI$) and ethylene carbonate (EC) according to a mass ratio of 90:10 to form a homogeneous solution. Then $LiPF_6$ and lithium bis(trifluoromethylsulfonyl)imide (LiTFSI) were added with a mole ratio of the two lithium salts being 1:7. The mixture was dissolved to form an electrolyte solution (0.8 mol/L). Detecting and analyzing by ion chromatograph and ICP means, the result showed that in the electrolyte, the content of halide ions ($Cl^-$, $Br^-$, $I^-$) was less than 5 ppm.

The assembly of the non-aqueous electrolyte secondary battery: Respectively taking active materials (the active material of the positive electrode was nickel-cobalt-manganese ternary material (523), and the active material of the negative electrode was lithium titanate $Li_4Ti_5O_{12}$), the conductive agent (e.g., conductive carbon black), and the binder (e.g., PVDF) according to a certain mass ratio, and then mixing them up uniformly. Adding solvent N-methylpyrrolidone and further mixing up uniformly, therefore preparing a slurry with a solid content 60%. And then coating the slurry onto an aluminum foil current collector, after drying and rolling, punching into plates. We chose PET separator, whose average pore diameter is above 1 μm, and whose porosity is above 65%. Assembling them into a flexible-packed battery in an industry drying house where humidity was strictly controlled, its designed capacity was 5 Ah.

Figure 5A:
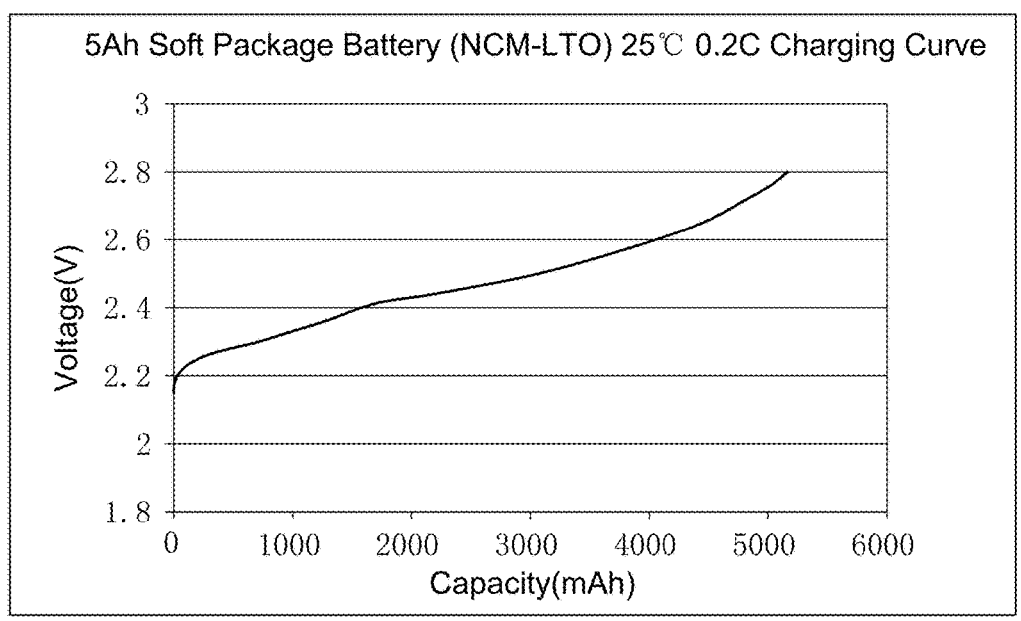
FIG. 5a illustrates the charging curve of the secondary battery prepared by embodiment 17.
Figure 5B:
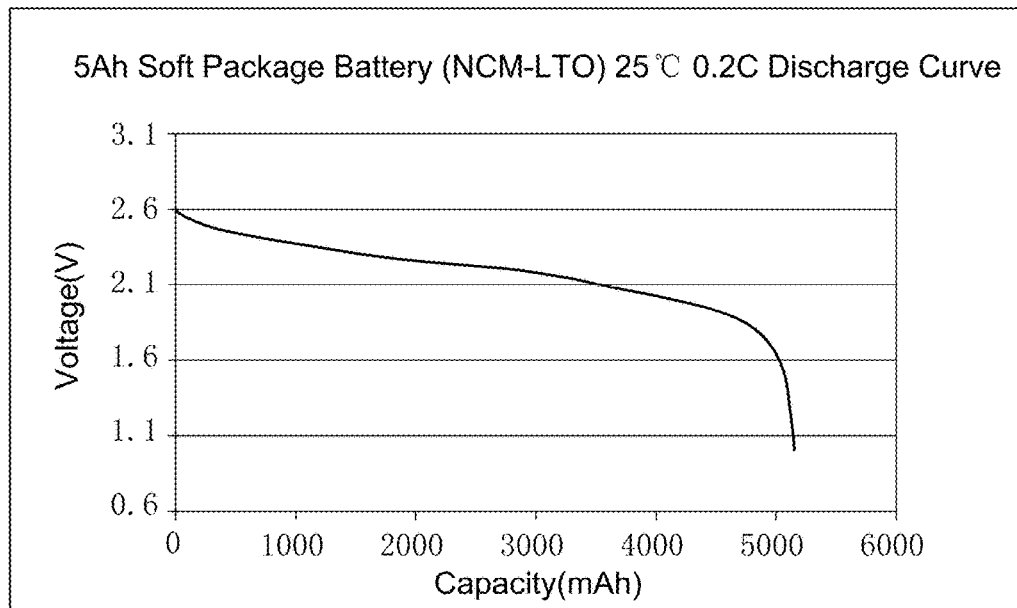
FIG. 5b illustrates the discharge curve of the secondary battery prepared by embodiment 17.

Battery performance test: Charging and discharging the above flexible-packed battery within a voltage range of 1.0V~2.8V under 25° C. environment temperature, with a constant current charge rate 0.2C, and a constant current discharge rate 0.2C. Battery charge-discharge performance was investigated, as shown in FIGS. 5a and 5b.

Embodiment 18:

The synthesis of the ionic liquid: N-n-butylpyrrolidine (500 g) was added into a pressure vessel. A mixture of trifluoromethanesulfonic acid (TFMS, 663 g) and 1000 mL of dimethyl carbonate were slowly added therein under nitrogen ($N_2$) atmosphere, with the temperature maintained no higher than 60° C. After addition, reacting under 140° C. and about 1.5 MPa for 15 hours. During the reaction, part of the inner gas was released by the air evacuation valve to avoid excess pressure. After reaction, removing low boiling substance under decompression and getting N-methyl-N-n-butyl pyrrolidinium trifluoromethanesulfonate.

The preparation of the ionic liquid electrolyte: Mixing N-methyl-N-n-butyl pyrrolidinium trifluoromethanesulfonate ($Pr_{1,4}OTf$) and propylene carbonate (PC) according to a mass ratio of 70:30 to form a homogeneous solution. $LiBF_4$ and lithium trifluoromethanesulfonate (LiOTf) were then added with a mole ratio of 9:1. The mixture was dissolved to form an electrolyte solution (1.0M/L). Detecting and analyzing by ion chromatograph and ICP means, the result showed that in the electrolyte, the content of halide ions ($Cl^-$, $Br^-$, $I^-$) was less than 5 ppm.

The assembly of the non-aqueous electrolyte secondary battery: Respectively taking active materials (the active material of the positive electrode was nickel-cobalt-manganese ternary material (523), and the active material of the negative electrode was lithium titanate $Li_4Ti_5O_{12}$), the conductive agent (e.g., conductive carbon black), and the binder (e.g., PVDF) according to a certain mass ratio, and then mixing them up uniformly. Solvent N-methylpyrrolidone was added, and then the mixture was further mixed to be uniform, therefore preparing a slurry with a solid content 60%. And then coating the slurry onto an aluminum foil current collector, after drying and rolling, punching into plates. We chose PET separator, whose average pore diameter is above 1 μm, and whose porosity is above 65%. Assembling them into a flexible-packed battery in an industry drying house where humidity was strictly controlled, its designed capacity was 5 Ah.

Figure 6A:
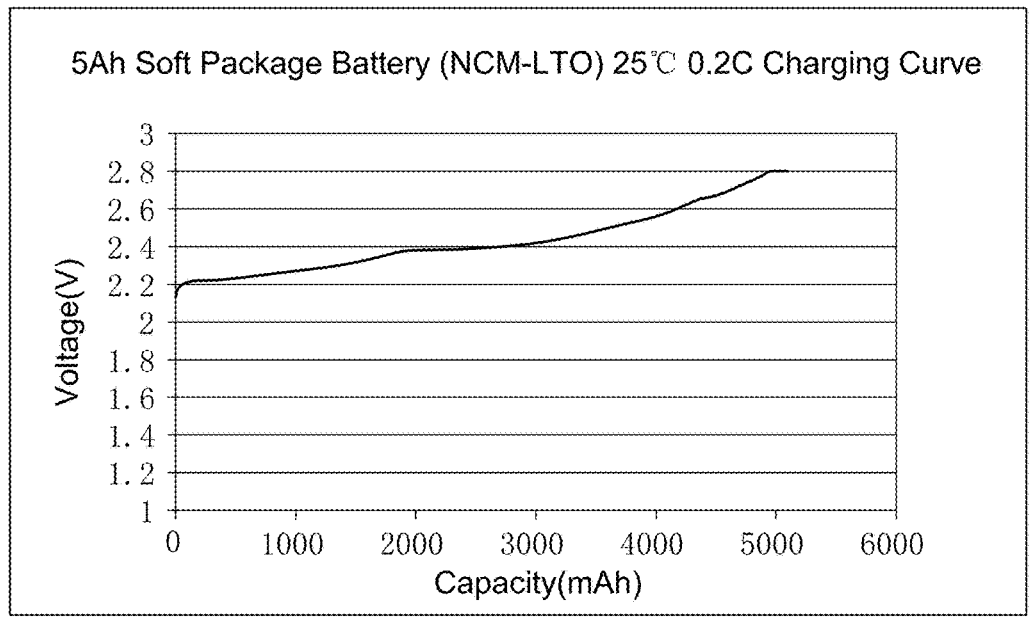
FIG. 6a illustrates the charging curve of the secondary battery prepared by embodiment 18.
Figure 6B:
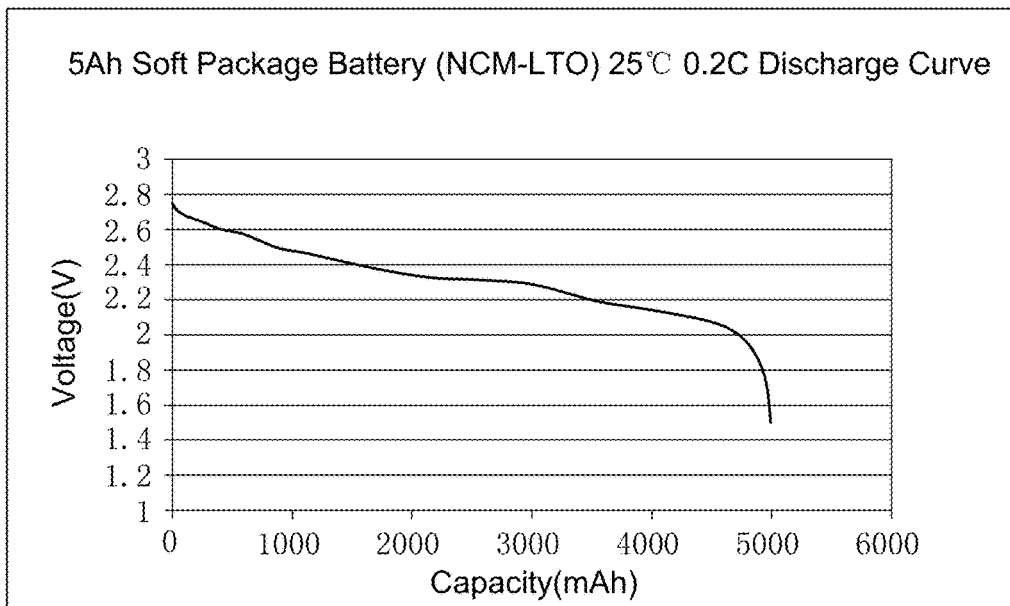
FIG. 6b illustrates the discharge curve of the secondary battery prepared by embodiment 18.

Battery performance test: Charging and discharging the above flexible-packed battery within a voltage range of 1.0V~2.8V under 25° C. environment temperature, with a constant current charge rate 0.2C, and a constant current discharge rate 0.2C. Battery charge-discharge performance was investigated, as shown in FIGS. 6a and 6b.

Embodiment 19:

The synthesis of the ionic liquid: N-n-butyl piperidine (500 g) and dimethyl carbonate were added into a pressure vessel together by a mole ratio of 1:3, and then raising temperature to 120° C. Bis(fluorosulfonic)imide was then added at a certain flow, wherein the mole ratio of N-n-butyl piperidine to bis(fluorosulfonic)imide was 1:1. Next, raising temperature up to 160° C. and continuing to react for 3 hours. During the reaction, if the pressure exceeded 1.6

MPa, some of the gas inside the vessel was released by an air evacuation valve to avoid excess pressure. After reaction, cooling to room temperature, removing low boiling substance under reduced pressure, then the product was washed and dried in vacuum, finally obtaining N-methyl-N-n-butyl piperidinium bis(fluorosulfonyl)imide (abbr. as $Py_{1,4}FSI$).

The preparation of the ionic liquid electrolyte: N-methyl-N-n-butyl piperidinium bis(fluorosulfonyl) imide (abbr. as $Py_{1,4}FSI$) was added, $LiPF_6$ and lithium bis(fluorosulfonyl) imide (abbr. as LiFSI) were then added with a mole ratio of 1:9. The mixture was dissolved to form an electrolyte solution (1.0M/L). Detecting and analyzing by ion chromatograph and ICP means, the result showed that in the electrolyte, the content of halide ions ($Cl^-$, $BC$, $F$) was less than 5 ppm.

The assembly of the non-aqueous electrolyte secondary battery: Respectively take active materials (the active material of the positive electrode was nickel-cobalt-manganese ternary material (523), and the active material of the negative electrode was lithium titanate ($Li_4Ti_5O_{12}$)), the conductive agent (e.g., conductive carbon black), and the binder (e.g., PVDF) according to a certain mass ratio, and then mixing them up uniformly. Adding solvent N-methylpyrrolidone and further mixing up uniformly, therefore preparing a slurry with a solid content 60%. And then coating the slurry onto an aluminum foil current collector, after drying and rolling, punching into plates. We chose PET separator, whose average pore diameter is above 1 μm, and whose porosity is above 65%. Assembling them into a flexible-packed battery in an industry drying house where humidity was strictly controlled, its designed capacity was 5 Ah.

Figure 7A:
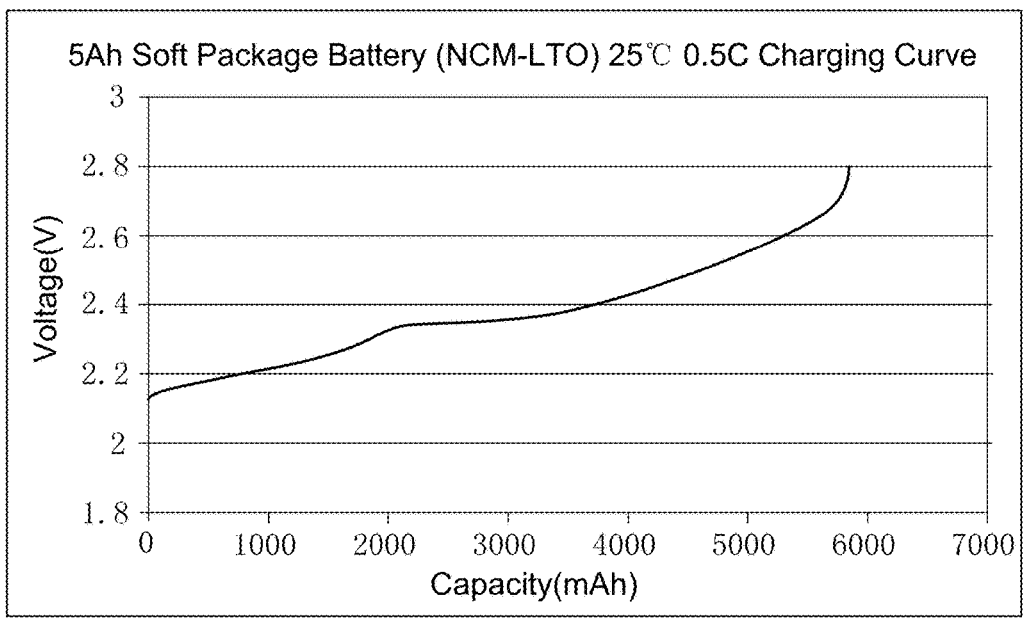
FIG. 7a illustrates the charging curve of the secondary battery prepared by embodiment 19.
Figure 7B:
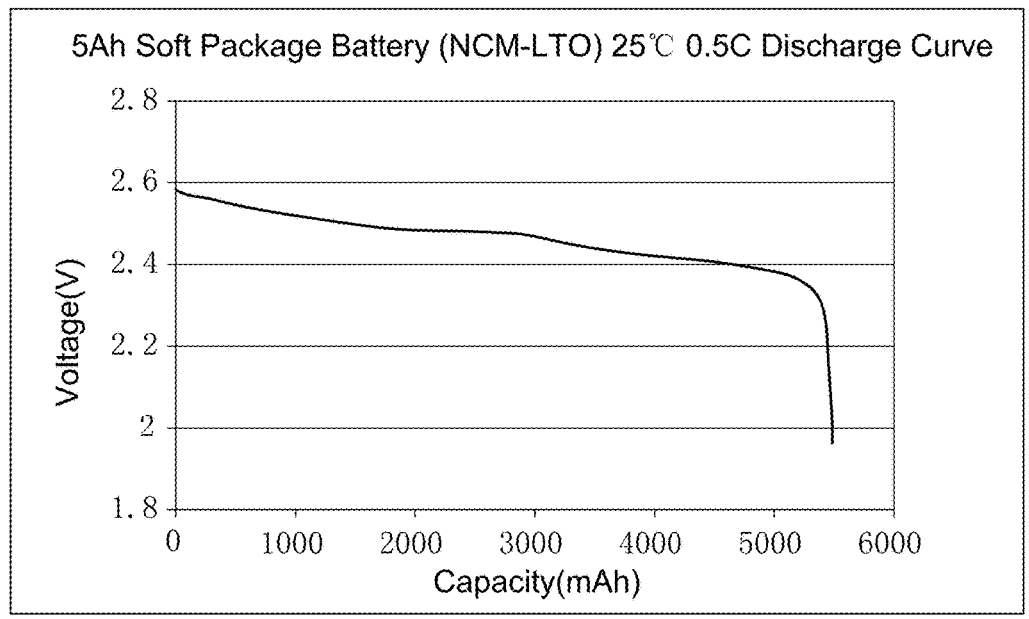
FIG. 7b illustrates the discharge curve of the secondary battery prepared by embodiment 19.

Battery performance test: Charging and discharging the above flexible-packed battery within a voltage range of 1.0V~2.8V under 25° C. environment temperature, with a constant current charge rate 0.5C, and a constant current discharge rate 0.5C. Battery charge-discharge performance was investigated, as shown in FIGS. 7a and 7b.

Embodiment 20:

The synthesis of the ionic liquid was the same as that in embodiment 19.

The preparation of the ionic liquid electrolyte: N-methyl-N-n-butyl piperidinium bis(fluorosulfonyl) imide (abbr. as $Py_{1,4}FSI$) and propylene carbonate were mixed at a mass ratio 95:5, then $LiPF_6$ and lithium bis(fluorosulfonyl)imide (abbr. as LiFSI) was added with a mole ratio of 1:9. The mixture was dissolved to form an electrolyte solution (1.0M/L). Detecting and analyzing by ion chromatograph and ICP means, the result showed that in the electrolyte, the content of halide ions ($Cl^-$, $Br^-$, $I^-$) was less than 5 ppm.

The assembly of the non-aqueous electrolyte secondary battery: Respectively taking active materials (the active material of the positive electrode was nickel-cobalt-manganese ternary material (523), and the active material of the negative electrode was lithium titanate ($Li_4Ti_5O_{12}$)), the conductive agent (e.g., conductive carbon black), and the binder (e.g., PVDF) according to a certain mass ratio, and then mixing them up uniformly. Solvent N-methylpyrrolidone was added and then the mixture was mixed to be uniform, therefore preparing a slurry with a solid content of 60%. And then coating the slurry onto an aluminum foil current collector, after drying and rolling, punching into plates. We chose polyvinylidene fluoride (abbr. as PVDF) separator, whose average pore diameter is above 1 μm, and whose porosity is above 60%. Assembling them into a flexible-packed battery in an industry drying house where humidity was strictly controlled, its designed capacity was 5 Ah.

Figure 8A:
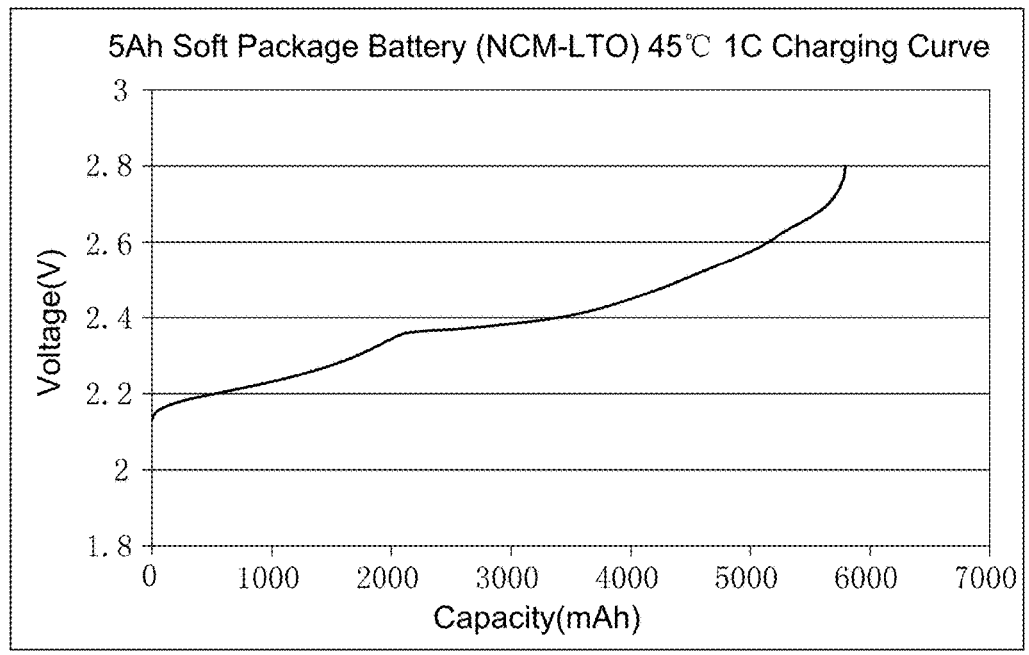
FIG. 8a illustrates the charging curve of the secondary battery prepared by embodiment 20.
Figure 8B:
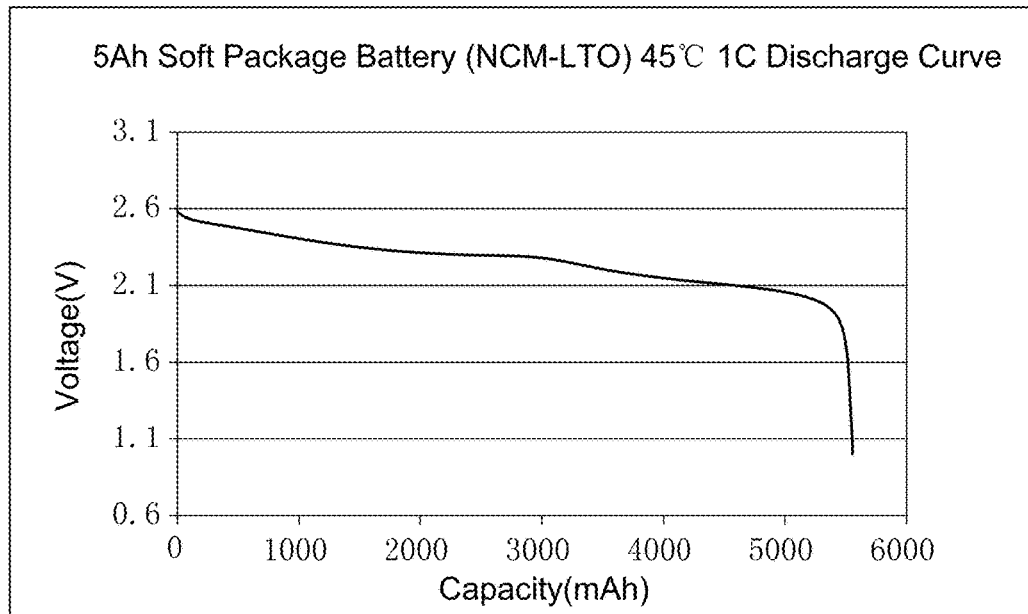
FIG. 8b illustrates the discharge curve of the secondary battery prepared by embodiment 20.

Battery performance test: Charging and discharging the above flexible-packed battery within a voltage range of 1.0V~2.8V under 45° C. environment temperature, with a constant current charge rate 1C, and a constant current discharge rate 1C. Battery charge-discharge performance was investigated, as shown in FIGS. 8a and 8b.

Comparative Embodiment 1

The synthesis of the ionic liquid was the same as that in embodiment 14.

The preparation of the ionic liquid electrolyte: N-methyl-N-propylpyrrolidinium bis(trifluoromethyl sulfonyl)imide (abbr. as $Pr_{1,3}TFSI$), propylene carbonate (PC) and vinylene carbonate (VC) were added according to a mass ratio 85:10:5 and a homogeneous solution was obtained. And then $LiPF_6$ and lithium bis(trifluoromethylsulfonyl)imide (LiTFSI) were added with a mole ratio of 1:7. The mixture was dissolved to form an electrolyte solution (0.8 mol/L). Detecting and analyzing by ion chromatograph and ICP means, the result showed that in the electrolyte, the content of halide ions ($Cl^-$, $Br^-$, $I^-$) was less than 5 ppm.

The assembly of the non-aqueous electrolyte secondary battery: Respectively taking active materials (the active material of the positive electrode was nickel-cobalt-manganese ternary material (523), and the active material of the negative electrode was graphite), the conductive agent (e.g., conductive carbon black), and the binder (e.g., PVDF) according to a certain mass ratio, and then mixing them up uniformly. Adding solvent N-methylpyrrolidone and further mixing up uniformly, therefore preparing a slurry with 60% solid content. And then coating the slurry onto an aluminum foil current collector, after drying and rolling, punching into plates. We chose PET separator, whose average pore diameter is above 1 μm, and whose porosity is above 65%. Assembling them into a flexible-packed battery in an industry drying house where humidity was strictly controlled, its designed capacity was 10 Ah.

Figure 9A:
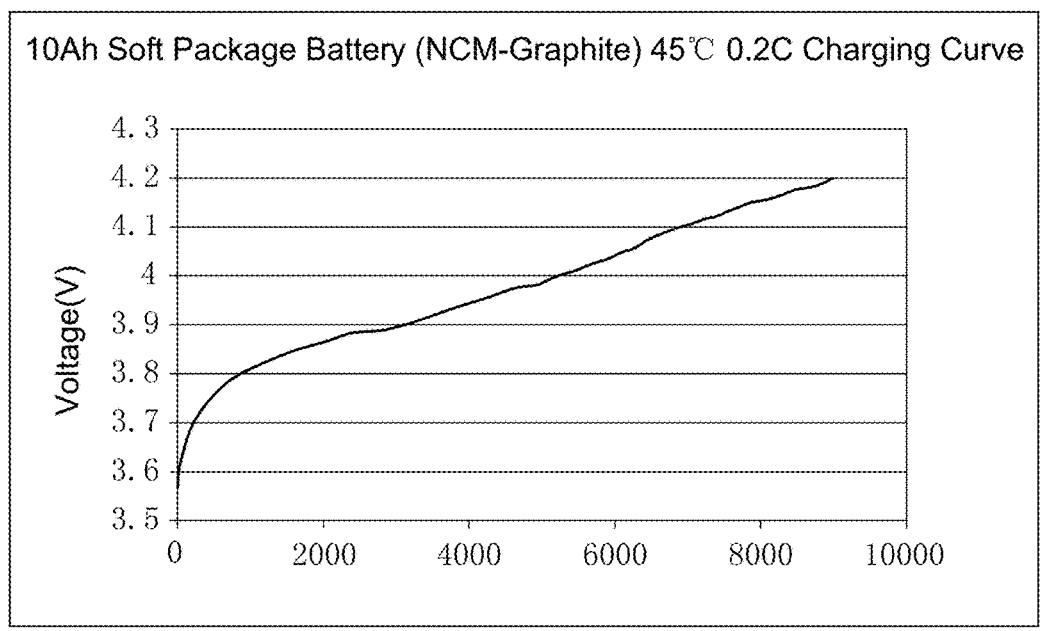
FIG. 9a illustrates the charging curves of the secondary battery prepared by comparative embodiment 1 of the present invention.
Figure 9B:
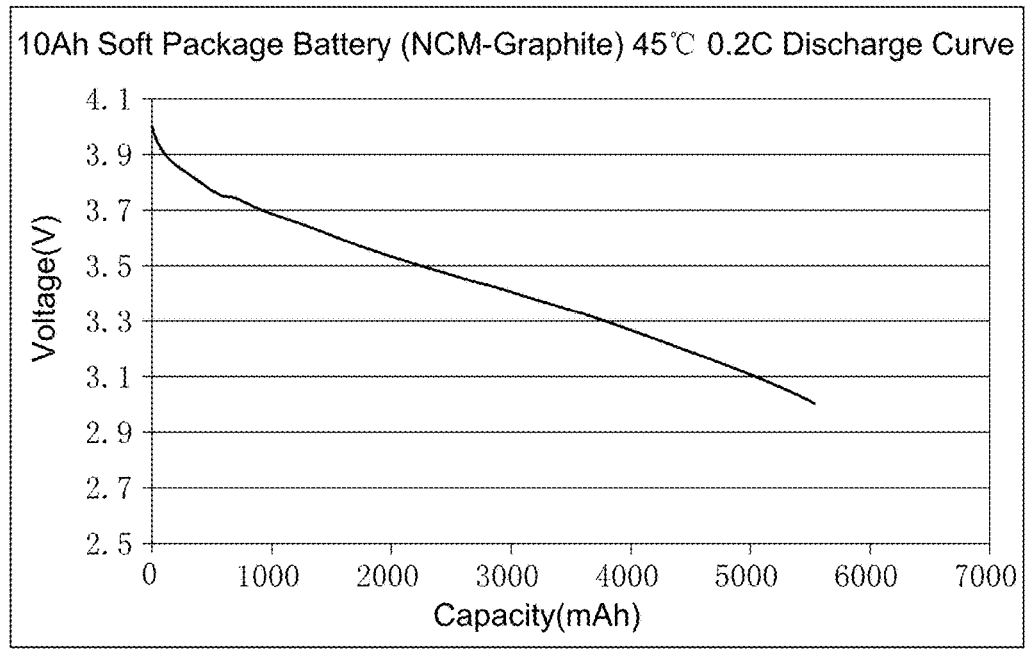
FIG. 9b illustrates the discharge curve of the secondary battery prepared by comparative embodiment 1 of the present invention.

Battery performance test: Charging and discharging the above flexible-packed battery within a voltage range of 3.0V~4.2V under 45° C. environment temperature, with a constant current charge rate 0.2C, and a constant current discharge rate 0.2C. Battery charge-discharge performance was investigated, as shown in FIGS. 9a and 9b.

Comparative Embodiment 2

The synthesis of the ionic liquid and the preparation of the ionic liquid electrolyte were the same as that in embodiment 20.

The assembly of the non-aqueous electrolyte secondary battery: Respectively taking active materials (the active material of the positive electrode was nickel-cobalt-manganese ternary material (523), and the active material of the negative electrode was lithium titanate ($Li_4Ti_5O_{12}$)), the conductive agent (e.g., conductive carbon black), and the binder (e.g., PVDF) according to a certain mass ratio, and then mixing them up uniformly. Adding solvent N-methylpyrrolidone and further mixing up uniformly, therefore preparing a slurry with a solid content 60%. And then coating the slurry onto an aluminum foil current collector, after drying and rolling, punching into plates. We chose PP/PE/PP separator, whose average pore diameter is less than 1 μm, and whose porosity is less than 50%. Assembling them into a flexible-packed battery in an industry drying house where humidity was strictly controlled, its designed capacity was 5 Ah.

Figure 10A:
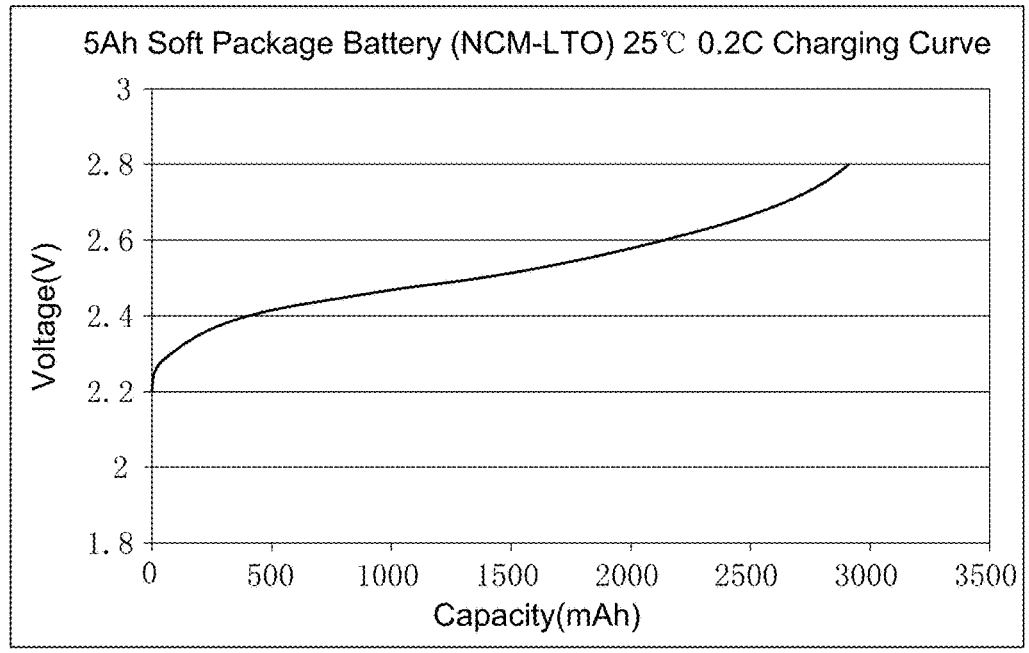
FIG. 10a illustrates the charging curve of the secondary battery prepared by comparative embodiment 2 of the present invention.
Figure 10B:
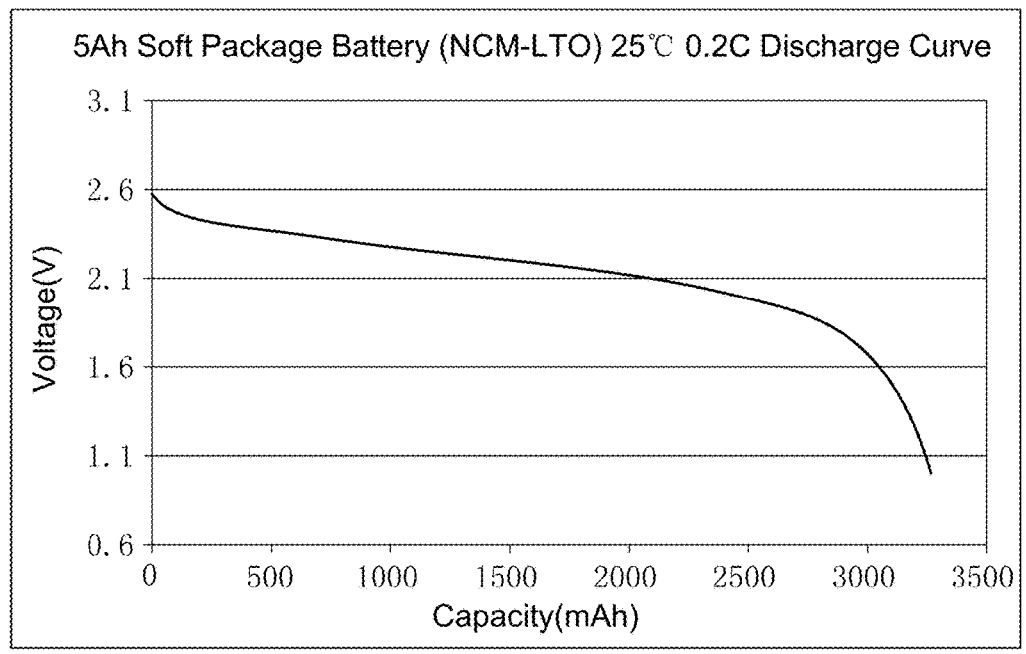
FIG. 10b illustrates the discharge curve of secondary battery prepared by comparative embodiment 2 of the present invention.

Battery performance test: Charging and discharging the above flexible-packed battery within a voltage range of 1.0V~2.8V under 25° C. environment temperature, with a constant current charge rate 0.2C, and a constant current discharge rate 0.2C. Battery charge-discharge performance was investigated, as shown in FIGS. 10a and 10b.

Comparative Embodiment 3

The synthesis of the ionic liquid: N-methylpyrrolidine (500 g) first undergoes a substitution reaction with 1000 mL bromopropane. And then potassium bis(trifluoromethylsulfonyl)imide (1243 g) was added therein, anion-exchange reaction took place, during which process the temperature was kept no higher than 60° C. After reaction, removing low boiling substance by decompression and washing the remains, drying in vacuum to obtain N-methyl-N-propylpyrrolidinium bis(trifluoromethylsulfonyl)imide (abbr. as $Pr_{1,3}TFSI$).

The preparation of the ionic liquid electrolyte: Mixing N-methyl-N-propylpyrrolidinium bis(trifluoromethyl sulfonyl)imide (abbr. as Pr1,3TFSI) with propylene carbonate (PC) by a mass ratio 85:15 to form a homogeneous solution. And then adding $LiPF_6$ and lithium bis(trifluoromethylsulfonyl)imide (abbr. as LiTFSI), the mole ratio of the above lithium salts was 1:7. The mixture was dissolved to form an electrolyte solution (0.8M.L). Detecting and analyzing by ion chromatograph and ICP means, the result showed that in the electrolyte, the content of alkali metal impurities was greater than 300 ppm, and the content of halide ions was greater than 300 ppm.

Figure 11:
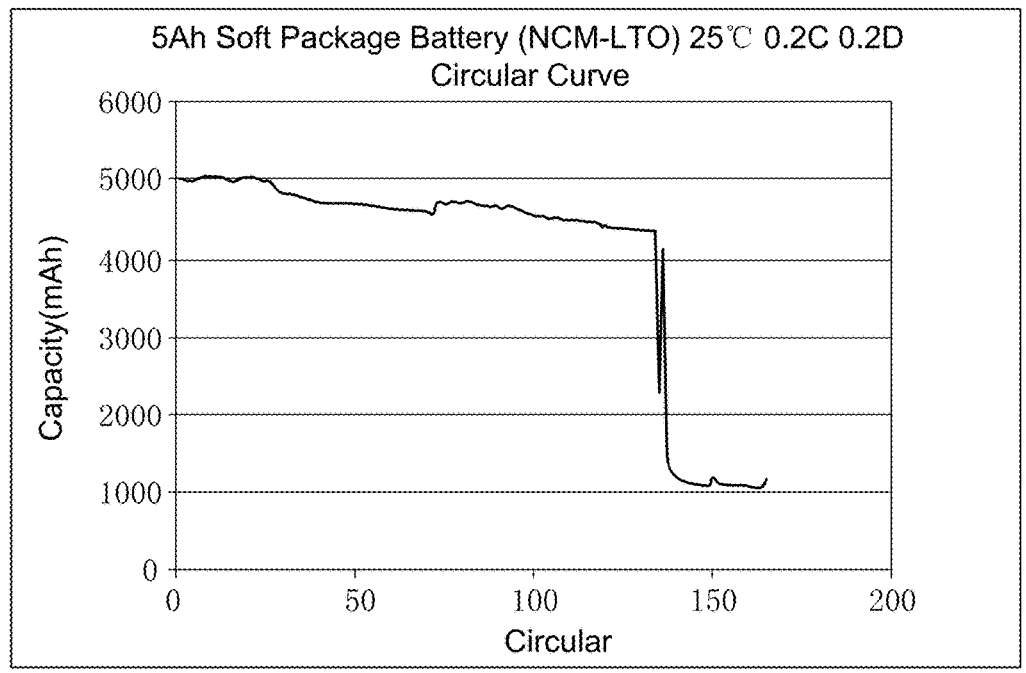
FIG. 11 illustrates the cycle life-span curve of the secondary battery prepared by comparative embodiment 3 of the present invention.

Battery performance test: Charging and discharging the above flexible-packed battery within a voltage range of 1.0V~2.8V under 25° C. environment temperature, with a constant current charge rate 0.2C, and a constant current discharge rate 0.2C. Battery capacity performance was investigated, as shown in FIG. 11.

In table 2, E represents the ionic liquid in electrolyte basic components, and F represents the organic solvent in electrolyte basic components, G and H represents the functional additive or film forming agent in electrolyte basic components. As shown in table 2, there are three comparative embodiments in the present invention, i.e., comparative embodiments 1 to 3 respectively, wherein comparative embodiment 1 is mainly used to verify the effect introduced by the negative electrode with graphite as the active material Comparative embodiment 2 is mainly used to verify the effects introduced by the non-polar separator, and comparative embodiment 3 is used to verify the effects introduced by the ionic liquid (with a concentration of halide ions greater than 300 ppm) prepared by anion-exchange process.

Figure 12:
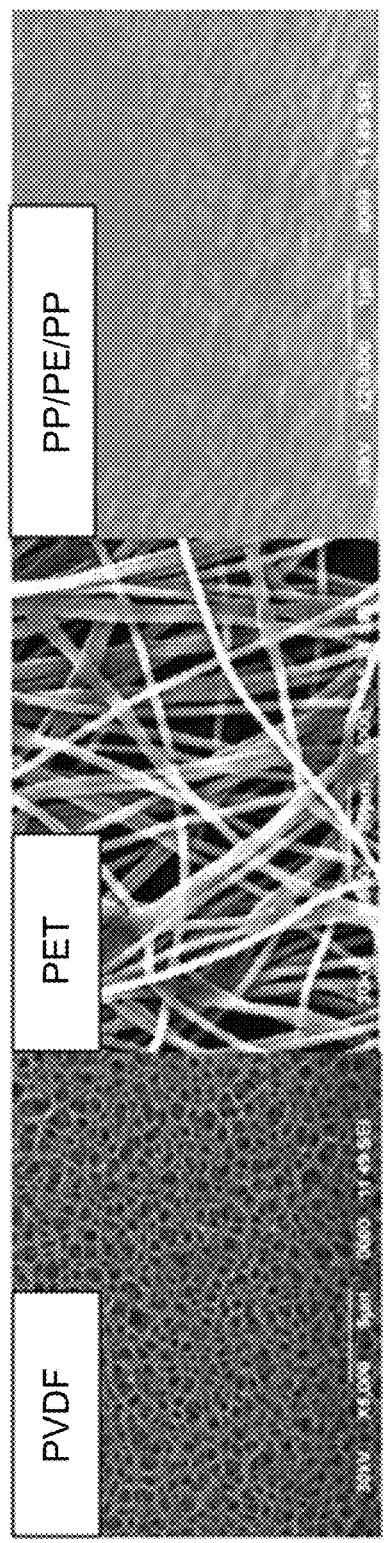
FIG. 12 illustrates scanning electron microscope (SEM) images of three separators made of PVDF, PET, PP/PE/PP membranes used in embodiments of the present invention.

Referring FIG. 12, comparing embodiment 14, embodiment 15, embodiment 16, embodiment 17, embodiment 18, embodiment 19, embodiment 20 and comparative embodiment 1, it shows that if the active material contained in the negative electrode is a material whose intercalation/deintercalation potential is not lower than 0.25V(vs. $Li/Li^+$), when using the ionic liquid and the electrolyte solution prepared by the method of the present invention, the battery can realize normal charging and discharging and can perform its nominal capacity at 25° C. environmental temperature. If the active material of the negative electrode is graphite (whose intercalation/deintercalation potential is lower than 0.25V (vs. $Li/Li^+$)), the battery shows abnormal charging and discharging and can't perform nominal capacity, bulge will occur on it. If the battery is disassembled, we can find that the active material coating on the negative electrode has delaminated and stripped off from the current collector. All

TABLE 2 nona-queous electrolyte secondary battery composition of embodiments 14~20 and comparative embodiments 1~3

| Embodiment | Positive electrode | Negative electrode | Separator | Ionic liquid electrolyte | | | | | |
|---|---|---|---|---|---|---|---|---|---|
| | | | | E (wt. %) | F (wt. %) | G (wt. %) | H (wt. %) | Mole ratio of two lithium salts | Purity |
| Embodiment 14 | NCM | LTO | PET | $Pr_{1,3}TFSI$ (85) | PC (15) | 0 | 0 | $LiPF_6$:LiTFSI = 1:7 | Halide ions < 5 ppm |
| Embodiment 15 | NCA | Si/C | PET | $Pr_{1,3}TFSI$ (85) | PC (10) | FEC (3) | VC (2) | $LiPF_6$:LiTFSI = 4:4 | Halide ions < 5 ppm |
| Embodiment 16 | NCM | Si/Cu | PET | $Pr_{1,3}TFSI$ (85) | PC (10) | FEC (3) | 1,3-PS (2) | $LiPF_6$:LiTFSI = 4:4 | Halide ions < 5 ppm |
| Embodiment 17 | NCM | LTO | PET | $Pr_{1,3}TFSI$ (90) | EC (10) | 0 | 0 | $LiPF_6$:LiTFSI = 1:7 | Halide ions < 5 ppm |
| Embodiment 18 | NCM | LTO | PET | $Pr_{1,4}OTf$ (70) | PC (30) | 0 | 0 | $LiBF_4$:LiFSI = 9:1 | Halide ions < 5 ppm |
| Embodiment 19 | NCM | LTO | PET | $Py_{1,4}FSI$ (100) | 0 | 0 | 0 | $LiPF_6$:LiFSI = 1:9 | Halide ions < 5 ppm |
| Embodiment 20 | NCM | LTO | PVDF | $Py_{1,4}FSI$ (95) | PC (5) | 0 | 0 | $LiPF_6$:LiFSI = 1:9 | Halide ions < 5 ppm |
| Comparative embodiment 1 | NCM | Graphite | PET | $Pr_{1,3}TFSI$ (85) | PC (10) | VC (5) | 0 | $LiPF_6$:LiTFSI = 1:7 | Halide ions < 5 ppm |
| Comparative embodiment 2 | NCM | LTO | PP/PE | $Py_{1,4}FSI$ (95) | PC (5) | 0 | 0 | $LiPF_6$:LiFSI = 1:9 | Halide ions < 5 ppm |
| Comparative embodiment 3 | NCM | LTO | PET | $Pr_{1,3}TFSI$ (85) | PC (15) | 0 | 0 | $LiPF_6$:LiTFSI = 1:7 | Halide ions > 300 ppm | these show that, when active material of the positive electrode in secondary battery is lithium-cobalt-manganese composite oxide or lithium-nickel-cobalt composite oxide, the ionic liquid electrolyte can only be used at the conditions where active material of the negative electrode is selected from the following: a lithium titanate, a crystalline silicon, a carbon-silicon composite, a silicon-copper composite, or a silicon-tin composite etc. If graphite is used at the presence of the ionic liquid electrolyte, since intercalation potential of the ionic liquid cation is higher than that of lithium ion, if charged, ionic liquid cation will intercalate into graphite layers earlier than lithium ion, blocking the intercalation path of lithium ion, and even 'prop' opening the graphite layers, which leads to the graphite layers stripping off. Such phenomenon can't be avoided even by adding film-forming agent such as VC etc.

What is claimed is:

1. A preparation method of an ionic liquid, wherein the ionic liquid is synthesized by a one-step reaction wherein a nitrogenous compound or a phosphorous compound, and a proton compound react with a carbonate ester in one step; wherein a temperature of said one-step reaction is controlled in 120~180° C.; the nitrogenous compound is at least one selected from a group consisting of ammonia ($NH_3$), a primary amine($R_1NH_2$), a secondary amine($R_1R_2NH$) and a tertiary amine($R_1R_2R_3N$); the phosphorous compound is at least one selected from a group consisting of phosphine ($PH_3$), a primary phosphine($R_1PH_2$), a secondary phosphine ($R_1R_2PH$) and a tertiary phosphine($R_1R_2R_3P$); wherein each of the $R_1$, $R_2$ and $R_3$ is selected from hydrogen, alkyl, alkenyl, alkynyl, phenyl or aryl; or each of the $R_1$, $R_2$ and $R_3$ is an organic group comprising at least one element of the following: boron, silicon, oxygen, nitrogen, phosphorus, sulfur, fluorine, chlorine, bromine and iodine; each of the $R_1$, $R_2$ and $R_3$ is a substituent group; or at least two of the $R_1$, $R_2$ and $R_3$ adjacent to each other joined into a ring.

2. The preparation method of the ionic liquid of claim 1, wherein said nitrogenous compound is at least one selected from a group consisting of

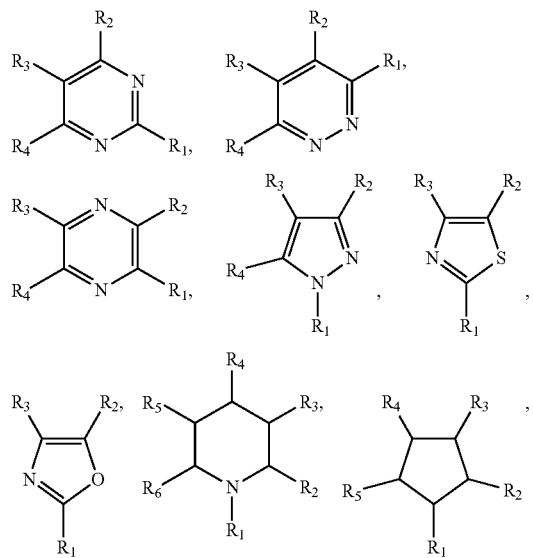

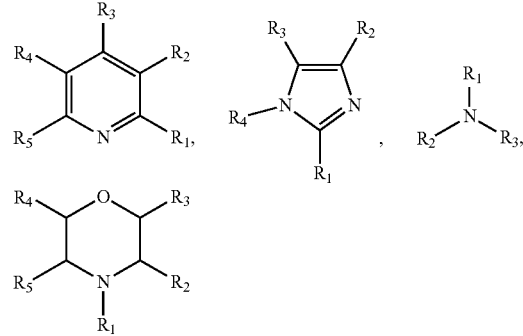

wherein each of said $R_1$, $R_2$, $R_3$, $R_4$, $R_5$ and $R_6$ is selected from hydrogen, alkyl, alkenyl, alkynyl, phenyl or aryl; or each of said $R_1$, $R_2$, $R_3$, $R_4$, $R_5$ and $R_6$ is an organic group comprising at least one element selected from the following: boron, silicon, oxygen, nitrogen, phosphorus, sulfur, fluorine, chlorine, bromine and iodine; each of said $R_1$, $R_2$, $R_3$, $R_4$, $R_5$ and $R_6$ is a substituent group; or at least two of said $R_1$, $R_2$, $R_3$, $R_4$, $R_5$ and $R_6$ adjacent to each other joined into a ring.

3. The preparation method of the ionic liquid of claim 1, wherein said phosphorous compound is at least one selected from a group consisting of methylphosphine, dimethylphosphine, trimethylphosphine, ethylphosphine, diethylphosphine, triethylphosphine, tripropylphosphine, di-tert-butylphosphine, tri-tert-butylphosphine, tri-butylphosphine, tri-n-pentylphosphine, cyclohexylphosphine, dicyclohexylphosphine, tricyclohexylphosphine, trihexylphosphine, trioctylphosphine, phenyl phosphine, diphenylphosphine, triphenylphosphine, dimethylphenylphosphine, diethylphenylphosphine, diphenyl-butylphosphine, tribenzylphosphine, tris(hydroxymethyl)phosphine, 2-chloroethyl-diethylphosphine and tri(pentafluoroethyl) phosphine.

4. The preparation method of the ionic liquid of claim 1, wherein said proton compound is at least one selected from a group consisting of an inorganic oxyacid, an inorganic oxygen-free acid, an organic acid and a non-acid proton compound.

5. The preparation method of the ionic liquid of claim 4, wherein said inorganic oxyacid is at least one selected from a group consisting of $HAlO_2$, $HAl(OH)_4$, $H_3AsO_4$, $HAsO_2$, $H_3AsO_3$, $H_4As_2O_7$, $H_3BO_3$, $(HBO_2)n$, $H_2B_4O_7$, $HBO_3$, $H_5BW_{12}O_{40}$, $HBrO_3$, $HBrO_2$, $HBrO$, $HBrO_4$, $H_4CO_4$, $H_2C_2O_6$, $H_2CO_4$ or $H_2CO_3$, $H_2O_2$, $HClO_3$, $HClO_4$, $HClO_2$, $HClO$, $HONC$, $HOCN$, $HNCO$, $HIO_3$, $HIO$ or $IOH$, $HIO_4$, $H_5IO_6$, $H_4I_2O_9$, $HNO_3$, $HNO_2$, $H_3PO_4$, $H_5PO_5$, $(HPO_3)_n$, $H_3PO_3$, $H_4P_2O_5$, $HPO_2$, $H_3PO_2$, $H_4P_2O_6$, $H_4P_2O_7$, $H_2SO_4$, $H_2SO_3$, $H_2S_2O_3$, $H_2S_2O_7$, $H_2SO_2$, $H_2S_xO_6(x=2~6)$, $H_6SO_6$, $H_2S_2O_4$, $H_2SO_5$, $H_2S_2O_8$, $HSO_3Cl$, $HSO_3F$, $H_2SiO_3$ or $SiO_2.H_2O$, $H_4SiO_4$, $H_2Si_2O_5$ or $2SiO_2.H_2O$, $H_4Si_3O_8$, and $H_6Si_2O_7$ or $2SiO_2.3H_2O$.

6. The preparation method of the ionic liquid of claim 4, wherein said inorganic oxygen-free acid is at least one selected from a group consisting of $H[CHB_{11}Cl_{11}]$, $H_2S$, $H_2CS_4$, $H_2CS_3$, $HCN$, $HSeCN$, $HSCN$, $HBF_4$, $H_2SiF_6$, $HPF_6$, $HF$, $HCl$, $HBr$ and $HI$.

7. The preparation method of the ionic liquid of claim 4, wherein said organic acid is at least one selected from a group consisting of oxalic acid, methanoic acid, acetic acid, propionic acid, succinic acid, trifluoroacetic acid, trifluoromethanesulfonic acid, methanesulfonic acid, mandelic acid, methylsulfate, ethylsulfate, oleic acid, stearic acid, acrylic acid, maleic acid, citric acid, bis(catecholato)boronic acid, bis(oxalate)boronic acid, bis(malonate)boronic acid, tri(pentafluoroethyl)trifluorophosphate, triethyltrifluorophosphate, tetracyanoboronic acid, tartaric acid, malic acid, citric acid, ascorbic acid, benzoic acid, benzenesulfonic acid, p-toluene sulfonic acid, salicylic acid, and caffeic acid.

8. The preparation method of the ionic liquid of claim 4, wherein said non-acid proton compound is an imine compound; said imine compound has a structure as described by formula 1, formula 2 or formula 3:

$$HN(C_mF_{2m+1}SO_2)(C_nF_{2n+1}SO_2);$$ Formula 1:

$$HN(C_nF_{2n+1}SO_2)_2;$$ Formula 2:

$$HN(C_xF_{2x}SO_2)_2;$$ Formula 3:

wherein m is an integer of 0 to 5, n is an integer of to 5, x is an integer of 1 to 10.

9. The preparation method of the ionic liquid of claim 8, wherein said imine compound is at least one selected from a group consisting of

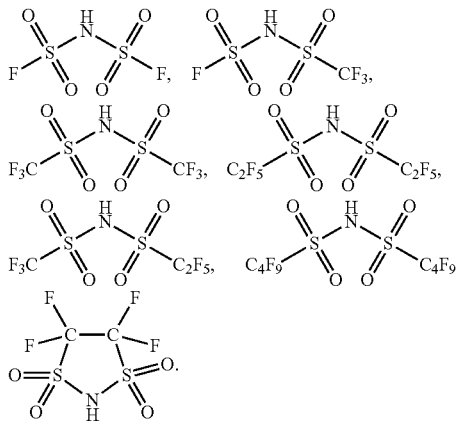

10. The preparation method of the ionic liquid of claim 4, wherein said non-acid proton compound is at least one selected from a group consisting of tri(trifluoromethylsulfonyl)methane, phenol, p-methylphenol, β-naphthol, 2,4-dichlorophenol and p-aminophenol.

11. The preparation method of the ionic liquid of claim 1, wherein said carbonate ester is at least one selected from a group consisting of dimethyl carbonate, ethyl methyl carbonate, diethyl carbonate, ethylene carbonate, propylene carbonate, phenyl methyl carbonate, diphenyl carbonate and dibenzyl carbonate.

12. The preparation method of the ionic liquid of claim 11, wherein said carbonate ester is at least one selected from a group consisting of dimethyl carbonate, ethyl methyl carbonate and diethyl carbonate.

13. The preparation method of the ionic liquid of claim 1, wherein the temperature of said one-step reaction is controlled in 140~160° C.

14. The preparation method of the ionic liquid of claim 1, wherein the absolute pressure of said one-step reaction is controlled in 0.1~3.0 Mpa.

15. The preparation method of the ionic liquid of claim 14, wherein the absolute pressure of said one-step reaction is controlled in 0.8~2.0 Mpa.

16. The preparation method of the ionic liquid of claim 15, wherein the absolute pressure of said one-step reaction is controlled in 1.0~1.5 Mpa.

17. The preparation method of the ionic liquid of claim 1, wherein the reaction time of said one-step reaction is controlled in 0.1~20 hours.

18. The preparation method of the ionic liquid of claim 17, wherein the reaction time of said one-step reaction is controlled in 4~15 hours.

19. The preparation method of the ionic liquid of claim 18, wherein the reaction time of said one-step reaction is controlled in 9~12 hours.

20. An electrolyte used in a secondary battery, comprising the ionic liquid prepared by the preparation method as described in claim 1.

* * * * *